United States Patent
Taguchi et al.

(10) Patent No.: US 8,641,937 B2
(45) Date of Patent: Feb. 4, 2014

(54) METHOD OF MANUFACTURING LENS CASTING MOLD AND METHOD OF MANUFACTURING EYEGLASS LENS

(75) Inventors: Noriaki Taguchi, Tokyo (JP); Shigeru Takizawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 309 days.

(21) Appl. No.: 12/995,363

(22) PCT Filed: Feb. 26, 2010

(86) PCT No.: PCT/JP2010/001344
§ 371 (c)(1),
(2), (4) Date: Feb. 11, 2011

(87) PCT Pub. No.: WO2010/098137
PCT Pub. Date: Sep. 2, 2010

(65) Prior Publication Data
US 2011/0127685 A1   Jun. 2, 2011

(30) Foreign Application Priority Data

Feb. 27, 2009 (JP) ................................. 2009-046708
Mar. 30, 2009 (JP) ................................. 2009-083061
May 29, 2009 (JP) ................................. 2009-130289

(51) Int. Cl.
*B29D 11/00* (2006.01)

(52) U.S. Cl.
USPC ............ 264/2.5; 65/29.19; 65/107; 264/40.6; 425/808

(58) Field of Classification Search
USPC ................. 264/1.1, 2.5, 2.7, 40.1, 40.6, 40.7; 425/808, 143, 144; 65/102, 106, 107, 65/29.19
See application file for complete search history.

(56) References Cited

U.S. PATENT DOCUMENTS

| | | |
|---|---|---|
| 2,015,007 A | 9/1935 | Emerson |
| 2,996,421 A | 12/1960 | Zimmerman et al. |
| 3,607,186 A | 9/1971 | Bognar |
| 3,623,800 A | 11/1971 | Volk |
| 4,018,587 A | 4/1977 | Maitenaz |
| 4,105,429 A | 8/1978 | Delgado |
| 4,119,424 A | 10/1978 | Comperatore |

(Continued)

FOREIGN PATENT DOCUMENTS

| | | |
|---|---|---|
| CN | 1267034 A | 9/2000 |
| CN | 101158749 A | 4/2008 |

(Continued)

OTHER PUBLICATIONS

Form PCT/ISA/210 (International Search Report) for International Application No. PCT/JP2010/001344, dated May 25, 2010.

(Continued)

*Primary Examiner* — Mathieu D. Vargot
(74) *Attorney, Agent, or Firm* — Sughrue Mion, PLLC

(57) ABSTRACT

A method for producing a mold for molding a lens wherein the upper surface of a glass material to be molded is molded by a thermal sag method using a continuous heating furnace. A mold having a curvature distribution on the molding surface is used, the highest temperature direction from the geometric center of the molding surface to the highest temperature point in the furnace is determined in one or more regions by measuring the temperature at a plurality of measuring points on the molding surface and the mold is rotated during the forming of the mold in which an eyeglass lens is subsequently molded.

12 Claims, 20 Drawing Sheets

(56) References Cited

U.S. PATENT DOCUMENTS

| | | |
|---|---|---|
| 4,349,374 A | 9/1982 | Rupp |
| 4,589,901 A | 5/1986 | Yoshizawa et al. |
| 4,859,225 A | 8/1989 | Kuster et al. |
| 4,883,524 A | 11/1989 | Bristol |
| 5,437,704 A | 8/1995 | Yli-Vakkuri et al. |
| 5,589,024 A | 12/1996 | Blake |
| 5,662,999 A | 9/1997 | Taniguchi et al. |
| 5,766,542 A | 6/1998 | Berrun-Castanon et al. |
| 6,240,746 B1 | 6/2001 | Maeda et al. |
| 6,363,747 B1 | 4/2002 | Budinski et al. |
| 6,623,269 B2 | 9/2003 | Tsutsui et al. |
| 6,740,366 B2 | 5/2004 | Hori et al. |
| 7,008,058 B2 | 3/2006 | Haimeri et al. |
| 7,950,252 B2 | 5/2011 | Chisha et al. |
| 2003/0147325 A1 | 8/2003 | Wilkinson et al. |
| 2004/0107731 A1 | 6/2004 | Doehring et al. |
| 2005/0093210 A1 | 5/2005 | Umetani |
| 2005/0110945 A1 | 5/2005 | Haimeri et al. |
| 2008/0049287 A1 | 2/2008 | Kimura et al. |
| 2008/0099935 A1 | 5/2008 | Egle et al. |
| 2008/0134721 A1 | 6/2008 | Maeda |
| 2009/0108477 A1 | 4/2009 | Yamakaji et al. |
| 2009/0127727 A1 | 5/2009 | Matsushima et al. |
| 2009/0289380 A1 | 11/2009 | Chisha et al. |
| 2011/0133352 A1 | 6/2011 | Taguchi et al. |
| 2011/0163466 A1 | 7/2011 | Taguchi et al. |
| 2011/0304064 A1 | 12/2011 | Taguchi et al. |

FOREIGN PATENT DOCUMENTS

| | | |
|---|---|---|
| EP | 0 154 382 A2 | 9/1985 |
| EP | 1 736 973 A2 | 12/2006 |
| JP | 55007507 A | 1/1980 |
| JP | 61-048801 A | 3/1986 |
| JP | 63-306390 A | 12/1988 |
| JP | 01-171932 A | 7/1989 |
| JP | 04-275930 A | 10/1992 |
| JP | 06-130333 A | 5/1994 |
| JP | 07-300328 A1 | 11/1995 |
| JP | 9-124339 A | 5/1997 |
| JP | 10-025123 A | 1/1998 |
| JP | 10-078567 A | 3/1998 |
| JP | 10-291828 A | 11/1998 |
| JP | 11-116257 A | 4/1999 |
| JP | 2000-229319 A | 8/2000 |
| JP | 2000-302473 A | 10/2000 |
| JP | 2000-327344 A | 11/2000 |
| JP | 2001-322830 A | 11/2001 |
| JP | 2001-335334 A | 12/2001 |
| JP | 2003-232902 A | 8/2003 |
| JP | 2005-132679 A | 5/2005 |
| JP | 2005-350286 A | 12/2005 |
| JP | 2008-221720 A | 9/2008 |
| KR | 2002-0060445 A | 7/2002 |
| RU | 2 087 430 C1 | 8/1997 |
| RU | 2245852 C1 | 2/2005 |
| SU | 121992 A1 | 2/1986 |
| SU | 1426954 A2 | 9/1988 |
| WO | 95-23769 A1 | 9/1995 |
| WO | 03/079095 A2 | 9/2003 |
| WO | 2005-108317 A1 | 11/2005 |
| WO | 2006/095007 A1 | 9/2006 |
| WO | 2007/058353 A1 | 5/2007 |
| WO | 2007/063734 A1 | 6/2007 |
| WO | 2007/063735 A1 | 6/2007 |
| WO | 2009/096085 A1 | 8/2009 |
| WO | 2009/144943 A1 | 12/2009 |

OTHER PUBLICATIONS

Form PCT/ISA/237 for International Application No. PCT/JP2010/001344, dated May 25, 2010.
International Search Report for International Patent Application No. PCT/JP2006/323135, dated Jan. 9, 2007.
Official Decision on Grant dated Oct. 26, 2010, for Russian Patent Application No. 2008126286.
International Search Report for International Patent Application No. PCT/JP2010/001343 dated May 25, 2010.
Written Opinion of International Patent Application No. PCT/JP2010/001343, dated May 10, 2010.
International Preliminary Report on Patentability of Chapter I for International Patent Application No. PCT/JP2009/002361, dated Jan. 20, 2011.
International Search Report for International Patent Application No. PCT/JP2009/002361, dated Jul. 14, 2009.
Written Opinion of the ISA for International Patent Application No. PCT/JP2009/002361, dated Jul. 14, 2009.
International Search Report for International Patent Application No. PCT/JP2008/071352, dated Feb. 17, 2009.
Official Decision on Grant dated Sep. 10, 2010, for Russian Patent Application No. 2008124837.
International Search Report for International Patent Application No. PCT/JP2006/323134, dated Jan. 9, 2007.
Chinese Office Action dated Jun. 30, 2011, issued in Chinese Patent Application No. 200680043172.0.
Written Opinion of the ISA for International Patent Application No. PCT/JP2006/323137, dated May 29, 2008.
Official Decision on Grant dated Sep. 7, 2010, issued in Russian Patent Application No. 2008124822.
International Search Report for International Patent Application No. PCT/JP2006/323137, dated Jan. 9, 2007.
Office Action dated Aug. 16, 2010, issued in U.S. Appl. No. 12/095,648.
Office Action dated Aug. 6, 2010, issued in U.S. Appl. No. 12/095,258.
Office Action dated Feb. 10, 2011, issued in U.S. Appl. No. 12/095,258.
Office Action dated Mar. 28, 2011, issued in U.S. Appl. No. 11/916,402.
Office Action dated Dec. 12, 2011, issued in U.S. Appl. No. 11/916,402.
Office Action dated Nov. 13, 2009, issued in U.S. Appl. No. 12/094,059.
Office Action dated May 24, 2010, issued in U.S. Appl. No. 12/094,059.
Office Action dated Nov. 9, 2011, issued in U.S. Appl. No. 12/094,059.
International Preliminary Report on Patentability of Chapter I for International Patent Application No. PCT/JP2010/001343, dated Sep. 9, 2011.
International Preliminary Report on Patentability of Chapter I for International Patent Application No. PCT/JP2010/001343, dated Sep. 22, 2011.
International Preliminary Report on Patentability of Chapter I for International Patent Application No. PCT/JP2010/001344, dated Sep. 9, 2011.
International Preliminary Report on Patentability of Chapter I for International Patent Application No. PCT/JP2010/001344, dated Sep. 22, 2011.
Derwent Abstract of JP 55007507.
Fine Ceramics World page on the web, per Kyocera Corporation, as a PDF (Ceramic pdf).
Japanese Patent Office Action dated Jun. 26, 2012, issued in JP Application No. 2007-545335.
Japanese Patent Office Action dated Jun. 26, 2012, issued in JP Application No. 2007-547903.
Chinese Office Action issued in Chinese Patent Application No. 200680043172.0 dated Jun. 13, 2012.
Office Action dated Sep. 29, 2013 issued by the Patent Office of the People's Republic of China in patent application No. 201080018054.0.
Office Action issued by the Intellectual Property Office of the People's Republic of China in corresponding Chinese Patent Application No. 201080018055.5 on Sep. 29, 2013.

(a) Before heating (b) After heating

● : Geometric center
○ : Maximum temperature point
✕ : Measurement point (a)

(b)

Position of the maximum temperature direction
on the forming surface

METHOD OF MANUFACTURING LENS CASTING MOLD AND METHOD OF MANUFACTURING EYEGLASS LENS

CROSS-REFERENCE TO RELATED APPLICATIONS

This application claims the benefit of priority to Japanese Patent Application No. 2009-46708 filed on Feb. 27, 2009, Japanese Patent Application No. 2009-83061 filed on Mar. 30, 2009, and Japanese Patent Application No. 2009-130289 filed on May 29, 2009, which are expressly incorporated herein by reference in their entirety.

TECHNICAL FIELD

The present invention relates to a method of manufacturing a lens casting mold by hot sag forming method, and a method of manufacturing an eyeglass lens using the lens casting mold manufactured.

BACKGROUND OF THE ART

Methods of forming glass molds for eyeglass lenses include employing mechanical grinding and polishing methods, mechanical grinding methods, and electrical processing methods such as electrical discharge processing to produce a heat-resistant base mold, bringing this base mold into contact with a glass blank softened by heating to transfer the surface shape of the base mold, employing a grinding program for each surface shape to be obtained, and forming a base mold having a corresponding surface shape.

In recent years, the demand has increased for multifocal eyeglass lenses being made thinner and lighter by incorporation of axially symmetric, aspherical lens design. The hot sag molding method has been proposed (see Japanese Unexamined Patent Publication (KOKAI) Heisei Nos. 6-130333 and 4-275930, which are expressly incorporated herein by reference in their entirety) as a method for forming molds to produce eyeglass lenses having such complex shapes.

In the hot sag forming method, a glass material is placed on a mold, and softened by being heated to a temperature greater than or equal to its softening point, causing it to tightly contact with the mold. The shape of the mold is thus transferred to the upper surface of the glass material, yielding a formed article of desired surface shape. The glass material can be heated in a batch-type heating furnace or continuous heating furnace, but to achieve production efficiency, continuous heating furnaces are widely employed.

As the object being heated is being conveyed within a continuous heating furnace, it is possible to continuously conduct a series of processes within the furnace in the form of a temperature-rising step, an elevated temperature-maintaining step, a temperature-lowering step and the like by controlling the temperature within the furnace so as to impart a prescribed temperature distribution in the conveyance direction. However, in a continuous heating furnace, the amount of change in various parts of the surface of the object being heated tends to be nonuniform due to the presence of the temperature distribution in the conveyance direction, as stated above. For example, when a glass material is formed by the hot sag forming method in a continuous heating furnace having a temperature distribution such that the temperature rises from the inlet to the outlet, the glass material heats up rapidly and the amount of deformation increases greater at the front part. When the amount of deformation varies with the position of the glass material in this manner, the timing at which the lower surface of the glass material contacts the forming surface of the mold varies greatly with position, producing astigmatism that is unnecessary in eyeglass correction and sometimes compromising the sensation created by wearing the eyeglass because the deviation from the design value is asymmetric.

In contrast, Japanese Unexamined Patent Publication (KOKAI) Showa No. 63-306390, which is expressly incorporated herein by reference in its entirety, proposes increasing the uniformity of heating by rotating the object being heated within the furnace in the course of sintering, metallizing, joining by brazing, and the like a ceramic product in a continuous heating furnace.

It is effective for the uniformity of heating to rotate the object being heated as described in Japanese Unexamined Patent Publication (KOKAI) Showa No. 63-306390. However, unanticipated astigmatisms are sometimes produced in the course of forming articles with complex shapes, such as casting molds for eyeglass lenses, by the hot sag forming method when achieving uniform heat distribution through simple rotation. In particular, unanticipated astigmatisms due to asymmetry are sometimes produced in the course of forming articles with free curved surface shapes lacking center symmetry, such as casting molds for progressive dioptric power lenses, by the hot sag forming method when achieving uniform heat distribution through simple rotation.

DISCLOSURE OF THE INVENTION

Accordingly, it is an object of the present invention to provide an eyeglass lens casting mold permitting the molding of an eyeglass lens affording a good wear sensation by the hot sag forming method with a continuous heating furnace.

The present inventors conducted extensive research into achieving the above object, resulting in the following discovery.

Among multifocal eyeglass lenses, progressive dioptric power lenses having a progressive surface the dioptric power of which changes continuously from top to bottom are widely employed as lenses for both far and near viewing. Within the progressive surface, the curvature of the near portion is great, and the curvature of the far portion is small. Accordingly, the molding surface of the mold for forming the progressive surface also has a great degree of curvature in the portion for molding the near portion, and a small degree of curvature in the portion for molding the far portion. Moreover, in the forming surface of the forming mold for forming the above molding surface of the mold by the hot sag forming method, the curvature of the portion corresponding to the portion of the molding surface of the mold for molding the near portion is great and the curvature of the portion corresponding to the portion for molding the far portion is small.

Accordingly, the present inventors discovered that the above object could be achieved by exploiting this shape characteristic and the nonuniformity of heating in a continuous heating furnace by rotating the forming mold so that the highly curved portion remained longer in the high temperature area in the continuous heating furnace based on the curvature distribution and temperature distribution on the forming surface of a forming mold, thereby controlling deformation due to heat softening. This was because rotating the forming mold in this manner made it possible to distribute the quantity of heat in accordance with the processing shape (shape of the forming mold), thereby permitting control of the amount of deformation using the temperature distribution within the furnace.

The first aspect of the present invention was devised based on this discovery.

The first aspect of the present invention relates to a method of manufacturing a lens casting mold by introducing a forming mold, with a forming surface on which a glass material being formed is positioned, into a continuous heating furnace and conducting thermal treatment while conveying the forming mold in the furnace to form an upper surface of the glass material being formed by bring a lower surface of the glass material being formed into tight contact with the forming surface, which comprises:

utilizing a forming mold having a curvature distribution on the forming surface as the forming mold;

specifying an average curvature in a direction running from a geometric center toward a perimeter portion of the forming surface of the forming mold in two or more different directions before introduction to the furnace;

directly or indirectly measuring a temperature at two or more measurement points on the forming surface of the forming mold in one or two or more regions within the furnace and specifying a direction running from the geometric center of the forming surface toward a point that is of maximum temperature among the two or more measurement points as a maximum temperature direction;

continuously or intermittently repeating approximately full circle rotation in a horizontal direction of the forming mold during passage through the furnace; and in the region in which the maximum temperature direction has been specified, conducting the rotation so that an angular rotation speed of the forming mold decreases as the average curvature in an $n^{th}$ direction passing through the maximum temperature direction increases, with n denoting an integer specifying each direction among the directions of which average curvatures have been specified without overlapping of the number n.

The above angular rotation speed may be determined so as to satisfy Equation A below:

$$\omega \cdot AC_n = k \qquad \text{Equation A}$$

wherein, in Equation A, $\omega$ denotes the angular rotation speed of the forming mold as the $n^{th}$ direction passes through the maximum temperature direction; $AC_n$ denotes the average curvature in the $n^{th}$ direction; and k denotes an approximate constant.

The above rotation may be controlled so that the angular rotation speed is minimized at the time when the direction running from the geometric center of the forming surface of the forming mold toward a portion where a curvature on the forming surface peaks passes through the maximum temperature direction.

The above lens casting mold may be a progressive dioptric power lens casting mold, and the portion where a curvature on the forming surface peaks may be a position corresponding to a reference point for measurement of near portion of the progressive dioptric power lens.

As described above, on the forming surface of a forming mold for forming a progressive dioptric power lens by the hot sag forming method, there is great curvature in the portion corresponding to the portion for molding the near portion and little curvature in the portion corresponding to the portion for molding the far portion of the molding surface of the mold. In contrast, in a continuous heating furnace, even when the temperature within the furnace is controlled, the temperature distribution of the atmosphere within the furnace does not necessarily match the temperature distribution on the forming mold. For example, in a continuous heating furnace having a temperature distribution such that the temperature increases from the inlet to the outlet, when the interior of the furnace is divided with partitions and the like, the temperature distribution is disrupted near the partitions, sometimes causing the high temperature side of the forming mold not to overlap the direction of conveyance of the forming mold.

Accordingly, the present inventors noted these shape characteristics and the nonuniformity of heating in a continuous heating furnace, monitored the temperature distribution on the forming surface of the forming mold in the continuous heating furnace, and reduced the rotational speed relative to the low temperature portion as the side corresponding to the portion for molding the near portion passed through the high temperature portion to permit distribution of the quantity of heat based on the processing shape (shape of the forming mold). As a result, they discovered that it was possible to achieve the above-stated object. This was because by causing the side corresponding to the portion molding the near portion that required considerable deformation to remain longer in the high temperature portion, the temperature distribution within the furnace could be exploited to control the amount of deformation, since there was considerable deformation on the side molding the near portion and little deformation on the side molding the far portion when forming a progressive surface by the hot sag forming method.

The second aspect of the present invention was devised on the basis of this discovery.

The second aspect of the present invention relates to a method of manufacturing a lens casting mold by introducing a forming mold, with a forming surface on which a glass material being formed is positioned, into a continuous heating furnace and conducting thermal treatment while conveying the forming mold in the furnace to form an upper surface of the glass material being formed into a shape of a molding surface for forming a surface comprising a progressive element or a progressive surface, comprising:

utilizing a forming mold having a curvature distribution on the forming surface as the forming mold;

continuously or intermittently repeating one rotation in a horizontal direction of the forming mold during passage through the furnace; and providing within the furnace a forming surface temperature distribution measurement position and directly or indirectly measuring a temperature of a plurality of measurement points on the forming surface at the forming mold temperature distribution measurement position; and specifying a virtual line A passing through a geometric center and a maximum temperature point among a plurality of measurement points, and then, among two portions divided in two by a virtual line B orthogonal to the virtual line A and passing through the geometric center, determining one portion containing the maximum temperature point as a high temperature portion and the other portion as a low temperature portion; and conducting the one rotation so that an angular rotation speed during a period when a portion on the forming surface of greatest curvature is present in the high temperature portion is lower than an angular rotation speed during a period when the portion is present in the low temperature portion.

The forming mold may be rotated so that an angular rotation speed of the one rotation becomes a minimum speed when a direction running from the geometric center toward the maximum temperature point on the virtual line A approximately overlaps a direction on which an average curvature from the geometric center to a perimeter portion of the forming surface peaks.

A plurality of measurement points described above may be arranged on concyclic positions on the forming surface to determine a correlation between the positions on the circle and temperature, and the one rotation is conducted at an angular rotation speed corresponding to the correlation that are determined.

The above angular rotation speed may be determined so as to satisfy Equation B below:

$$\omega \cdot (T - T\text{min} + 1)/(T\text{max} - T\text{min}) = \text{const} \quad \text{Equation B}$$

wherein, in Equation B, ω denotes the angular rotation speed, T denotes the temperature measured at a measurement point, Tmin denotes a minimum temperature among all measurement points, and Tmax denotes a maximum temperature among all measurement points.

The above one rotation may be conducted so that an angular acceleration speed during rotation is less than or equal to a predetermined reference value.

The above portion on the forming surface of greatest curvature may be at a position corresponding to a reference point for measurement of near portion of the lens.

A further aspect of the present invention relates to a method of manufacturing an eyeglass lens comprising:

manufacturing a lens casting mold by the above manufacturing method; and manufacturing an eyeglass lens by cast polymerization with the lens casting mold that has been manufactured, or some part thereof, as a casting mold. The eyeglass lens thus manufactured may be a progressive dioptric power lens.

The present invention permits the manufacturing with high production efficiency of progressive dioptric power lens casting molds capable of molding progressive dioptric power lenses affording an excellent wear sensation. This makes it possible to provide an eyeglass lens affording an excellent wear sensation.

MODE FOR CARRYING OUT THE INVENTION

Figure 1:
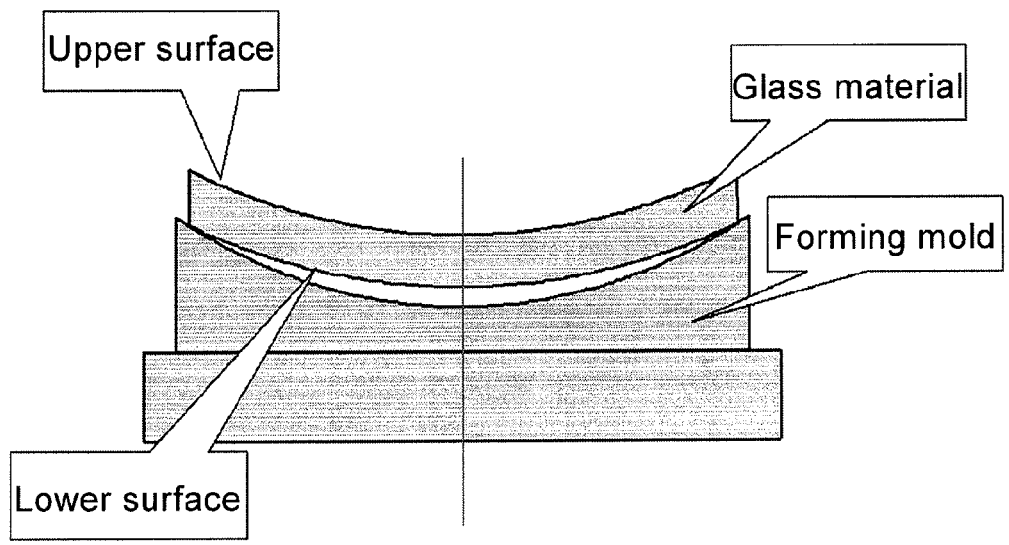
FIG. 1(*a*) shows a descriptive drawing of the hot sag forming method before heating and FIG. 1(*b*) shows the hot sag forming method after heating.
Figure 1:
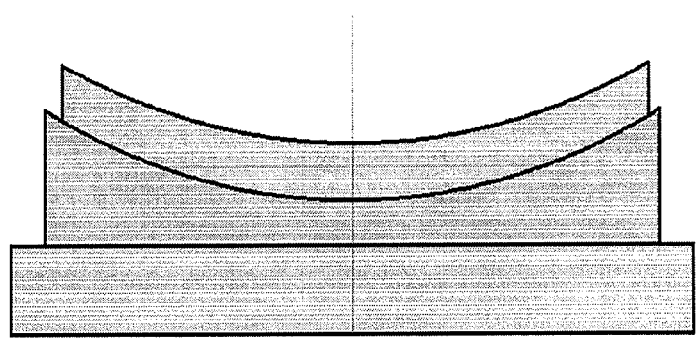

The present invention relates to a method of manufacturing a lens casting mold by introducing a forming mold, with a forming surface on which a glass material being formed (also simply referred to as a "glass material", hereinafter) is positioned, into a continuous heating furnace and conducting thermal treatment while conveying the forming mold in the furnace to form an upper surface of the glass material being formed by bring a lower surface of the glass material being formed into tight contact with the forming surface.

The first aspect of the present invention comprises utilizing a forming mold having a curvature distribution on the forming surface as the forming mold; specifying an average curvature in a direction running from a geometric center toward a perimeter portion of the forming surface of the forming mold in two or more different directions before introduction to the furnace; directly or indirectly measuring a temperature at two or more measurement points on the forming surface of the forming mold in one or two or more regions within the furnace and specifying a direction running from the geometric center of the forming surface toward a point that is of maximum temperature among the two or more measurement points as a maximum temperature direction; continuously or intermittently repeating approximately full circle rotation in a horizontal direction of the forming mold during passage through the furnace. And in the region in which the maximum temperature direction has been specified, the rotation is conducted so that an angular rotation speed of the forming mold decreases as the average curvature in an $n^{th}$ direction passing through the maximum temperature direction increases, with n denoting an integer specifying each direction among the directions of which average curvatures have been specified without overlapping of the number n.

The second aspect of the present invention relates to the method in which an upper surface of the glass material being formed is formed into a shape of a molding surface for forming a surface comprising a progressive element or a progressive surface, comprising utilizing a forming mold having a curvature distribution on the forming surface as the forming mold; continuously or intermittently repeating one rotation in a horizontal direction of the forming mold during passage through the furnace; and providing within the furnace a forming surface temperature distribution measurement position and directly or indirectly measuring a temperature of a plurality of measurement points on the forming surface at the forming mold temperature distribution measurement position. And a virtual line A passing through a geometric center and a maximum temperature point among a plurality of measurement points described above is specified, and then, among two portions divided in two by a virtual line B orthogonal to the virtual line A and passing through the geometric center, one portion containing the maximum temperature point is determined as a high temperature portion and the other portion is determined as a low temperature portion, and the one rotation is conducted so that an angular rotation speed during a period when a portion on the forming surface of greatest curvature is present in the high temperature portion is lower than an angular rotation speed during a period when the portion is present in the low temperature portion.

The casting mold that can be manufactured by the present invention has a molding surface shape for forming a surface comprising a progressive element or a progressive surface, and is preferably a progressive dioptric power lens casting mold. The term "progressive dioptric power lenses" refers to lenses having a progressive surface comprising a far portion and a near portion, in which the dioptric power changes progressively from the far portion to the near portion. Progressive dioptric power lenses include convex (exterior) progressive dioptric power lenses, in which the progressive surface is disposed within a convex surface, and concave (interior) progressive dioptric power lenses, in which the progressive surface is disposed within a concave surface. Convex progressive dioptric power lenses have a progressive surface within a convex surface and achieve progressive dioptric power by means of the shape of the convex optical surface. Concave progressive dioptric power lenses are similar, with the exception that they are concave instead of convex. The progressive dioptric power lens that can be molded by a casting mold manufactured according to the present invention can be either of these embodiments.

In the present invention, the lens casting mold is manufactured by the hot sag forming method.

FIG. 1 shows a descriptive drawing of the hot sag forming method.

Normally, in the hot sag forming method, the glass material being formed is subjected to thermal treatment while positioned on the forming mold in a state where the center of the lower surface of the glass material is separated from the forming surface of the forming mold (FIG. 1($a$)). Thus, the lower surface of the glass material being formed deforms under its own weight, coming into tight contact with the forming surface of the forming mold (FIG. 1($b$)) and causing the shape of the forming surface of the forming mold to be transferred to the upper surface of the glass material. As a result, the upper surface of the glass material can be formed into a desired shape. A casting mold that is thus manufactured can be used as the upper or lower mold of a mold for manufacturing plastic lenses by the casting polymerization method. More specifically, an upper mold and a lower mold can be assembled by means of a gasket or the like into a mold such that the upper surface of a glass material being formed by the hot sag forming method is positioned within the mold, and a plastic lens starting material liquid can be cast into the cavity of the mold and caused to polymerize, yielding a lens with a desired surface shape, such as progressive surface.

In the progressive surface, the curvature of the near portion is maximum (the radius of curvature is minimum), and the curvature of the far portion is minimum (the radius of curvature is maximum). Accordingly, the curvature of the portion for molding the near portion is also maximum and the curvature of the portion for molding the far portion is also minimum in the molding surface of the casting mold (the surface positioned within the cavity of the forming mold during casting polymerization). In the forming surface of the forming mold for use in the hot sag forming method for manufacturing the above casting mold, the curvature is also maximum in the portion corresponding to the portion for molding the near portion (the portion for molding the upper surface of the glass material into the portion for molding the near portion), and the curvature is also minimum in the portion corresponding to the portion for molding the near portion (the portion for molding the upper surface of the glass material into the portion for molding the far portion). That is, the forming mold has a curvature distribution on the forming surface, with at least a portion of the forming surface having different curvatures at any two points. The forming surface of the forming mold for forming a surface comprising a progressive element also has a curvature variation within the surface, and thus has a curvature distribution within the surface.

In order to bring the forming surface of the forming mold of varying curvature within the surface in this manner into tight contact with the lower surface of the glass material being formed, the portion that is to be brought into tight contact with the portion with a large curvature is desirably caused to deform greatly, and the portion that is to be brought into tight contact with the portion with a small curvature is desirably caused to deform only a little.

Therefore, in the present invention, conveyance is conducted in a continuous heating furnace while rotating the forming mold so that portions requiring considerable deformation to bring into tight contact with the forming surface remain for extended periods in the high temperature portion of the forming mold. This point will be described below.

A temperature gradient is necessarily generated in the interior of a continuous electric furnace. In other words, there is no continuous electric furnace with a uniform temperature distribution. Accordingly, the temperature distribution on an item being processed will necessarily be nonuniform. Additionally, there are eyeglass lenses with shapes that are center symmetric and those with shapes that are axially symmetric. Lenses comprising a progressive surface or a progressive element, such as progressive dioptric power lenses, have free curved surface shapes lacking simple symmetry. When a shape has center symmetry, it is considered easy to correct temperature nonuniformity by rotation about the geometric center based on the technique described in Japanese Unexamined Patent Publication (KOKAI) Showa No. 63-306390. However, when a shape does not possess axial symmetry or pair symmetry, it is difficult to handle by simple rotation. Accordingly, it has conventionally been difficult to enhance processing precision by achieving uniform heat distribution.

In contrast, the present inventors conducted extensive research resulting in the discovery that when a shape did not have center symmetry, it was not necessary to achieve uniform heat distribution, and that the addition of a large amount of heat in portions with shapes that had to undergo considerable deformation effectively enhanced processing precision. That is, the present invention can enhance processing precision by controlling the distribution of the quantity of heat (the distribution of the quantity of heat based on processing shape) according to the shape being processed (the shape of the forming mold) by the method described below. Further, when manufacturing a casting mold for progressive dioptric power lenses, it was possible to shorten the deformation time on the side for molding near portion, which had been rate controlling until now, thereby permitting a smaller total deformation (processing) time and thus shortening the processing time.

The first and second aspects of the present invention and items common to both will be described in further detail below. Unless specifically stated otherwise, the items described below are common to both aspects and to the reference aspect described further below. Any combination of the two aspects and the reference aspect is possible.

[Glass Material being Formed]

The glass material the upper surface of which is formed by being passed through a continuous heating furnace in the present invention is desirably a glass material with a lower surface being a spherical surface, a planar surface, or an aspherical surface with centrosymmetry. The reason for this is that since the lower surface of a glass material that is spherical in shape, for example, has a surface of constant curvature, the difference in the amount of deformation within the surface is particularly pronounced in the course of bringing it into tight contact with the forming surface of a forming mold of varying curvature within the surface. The same applies to a glass material with a lower surface that is planar and an aspherical surface with centrosymmetry. In such cases, as set forth above, the present invention makes it possible to control the amount of deformation caused by heating of the glass material in a continuous heating furnace. Further, the glass material being formed is desirably one comprising an astigmatic (toric) component on the upper surface in addition to having the above-described lower surface shape.

Figure 2:
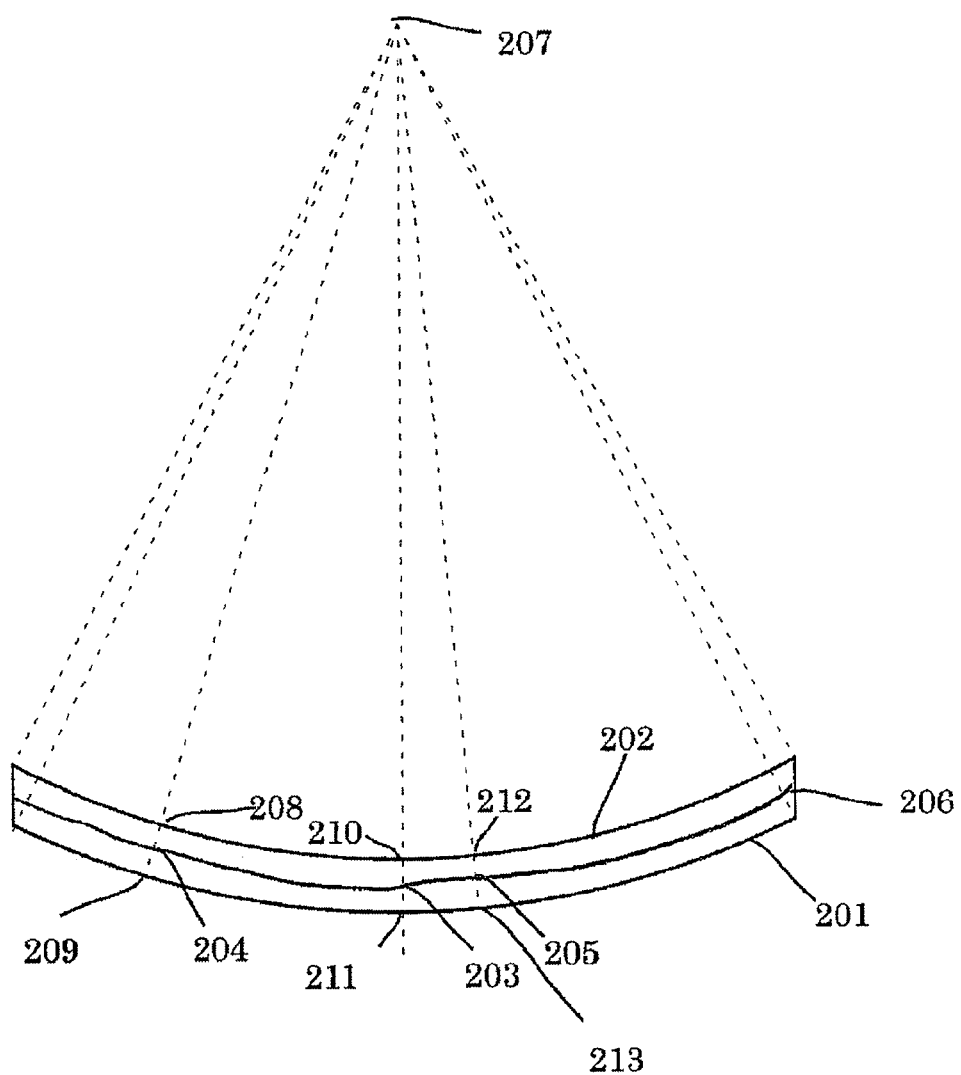
FIG. 2 shows an example (sectional view) of glass that is essentially equal in thickness in the normal direction.

Details of the lower surface shape of the glass material being formed are as set forth above. By contrast, the upper surface shape of the glass material being formed is not specifically limited, and can be any of shape, such as spherical, planar, or aspherical surface. The glass material being formed preferably has upper and lower surfaces being spherical. The glass material having a constant curvature on both upper and lower surfaces can readily processed and thus using a glass material with such shape is advantageous to increased productivity. The glass material used is preferably a glass material having convex and concave surfaces being spherical as well as being of equal or essentially equal thickness in the normal direction. In this context, the phrase "essentially equal thickness in the normal direction" means that at at least the geometric center of the glass material, the degree of change in thickness as measured in the normal direction is less than or equal to 1.0 percent, preferably less than or equal to 0.8 percent. FIG. 2 shows a schematic sectional view of such glass.

In FIG. 2, glass material 206 has a meniscus shape with concave and convex surfaces, the external shape being round. The surface shapes of the concave surface 202 and the convex surface 201 of the glass material are both spherical.

The term "normal direction" of the two surfaces of the glass material means the direction that is perpendicular to the glass material surface at any position on the surface of the glass material. Accordingly, the normal direction changes at each position on the surface. For example, direction 204 in FIG. 2 denotes the normal direction at point 208 on the concave surface of the glass material. The points of intersection of normal direction 204 with the concave and convex surfaces are 208 and 209, respectively. Thus, the interval between 208 and 209 is the thickness in the normal direction. There are other positions on the concave glass surface, such as 210 and 212, the normal directions of which are 203 and 205, respectively. In normal direction 203, the interval between 210 and 211, and in normal direction 205, the interval between 212 and 213, is the thickness in the normal direction. In a glass material of equal thickness in the normal direction, this spacing between the upper and lower surfaces in the normal direction is a constant value. That is, in glass materials of equal thickness in the normal direction, the upper and lower surfaces are parts of a spherical surface sharing a single center (207 in FIG. 2).

The glass material having the above-described approximately round shape has a shape that is center symmetric at the geometric center thereof. Additionally, since the forming surface of the forming mold has a shape corresponding to a formed article (casting mold), the shape is asymmetric, with the curvature being large in portions corresponding to portions for molding near portions and the curvature being small in portions corresponding to portions for molding far portions, for example, on the forming surface of the forming mold for manufacturing a progressive dioptric power lens casting mold. Therefore, in the present invention, by exploiting the nonuniformity of heating in a continuous heating furnace, as described below, rotation of the forming mold is conducted so that, in heat softening processing, positions at which the glass material undergoes high levels of shape change remained longer in the high temperature direction, making it possible to readily form a complex surface shape with various curvature within the surface, such as a progressive surfaces. As described in WO 2007/058353A1, which is expressly incorporated herein by reference in its entirety, when the glass material approximates a viscoelastic material, the thickness of the glass in the normal direction before and after heat softening in the hot sag forming method essentially does not change. Thus, the use of a glass material that is of equal thickness in the normal direction is advantageous in that it facilitates control of the shape during heat softening.

In order to approximate a glass material to a viscoelastic material, it is desirable for the outer diameter of the glass material to be adequately large relative to the thickness in the normal direction of the glass material, and for the outer diameter of the glass material to be adequately large relative to the amount of distortion in a direction perpendicular to the glass. Specifically, for the glass material employed in the present invention, it is desirable for the thickness in the normal direction to be 2 to 10 mm, preferably 5 to 7 mm. Further, the outer diameter of the glass material is desirably 60 to 90 mm, preferably 65 to 86 mm. The "outer diameter" of the glass material is the distance between any point on the lower surface edge rim portion of the glass material and the opposite point on the edge rim.

The glass material is not specifically limited. Glasses such as crown-based, flint-based, barium-based, phosphate-based, fluorine-containing, and fluorophosphate-based glasses are suitable. In a first example, suitable glass is glass comprising $SiO_2$, $B_2O_3$, and $Al_2O_3$ as the structural components and having the glass material composition of, given as molar percentages, 45 to 85 percent $SiO_2$, 4 to 32 percent $Al_2O_3$, 8 to 30 percent $Na_2O+Li_2O$ (with $Li_2O$ constituting equal to or less than 70 percent of $Na_2O+Li_2O$), the total quantity of ZnO and/or $F_2$ being 2 to 13 percent (where $F_2<8$ percent), $Li_2O+Na_2O/Al_2O_3$ being 2/3 to 4/1, and $SiO_2+Al_2O_3+Na_2O+Li_2O+ZnO+F_2>90$ percent.

In a second example, suitable glass are glass having the glass material composition of, given as molar percentages, 50 to 76 percent $SiO_2$, 4.8 to 14.9 percent $Al_2O_3$, 13.8 to 27.3 percent $Na_2O+Li_2O$ (where $Li_2O$ is less than or equal to 70 percent of $Na_2O+Li_2O$), the total quantity of ZnO and/or $F_2$ being 3 to 11 percent (where $F_2<8$ percent), $Li_2O+Na_2O/Al_2O_3$ being 2/3 to 4/1, and $SiO_2+Al_2O_3+Li_2O+Na_2O+Li_2O+ZnO+F_2>90$ percent.

In a third example, a further suitable glass composition is: $SiO_2$ (63.6 percent), $Al_2O_3$ (12.8 percent), $Na_2O$ (10.5 percent), $B_2O_3$ (1.5 percent), ZnO (6.3 percent), $Li_2O$ (4.8 percent), $As_2O_3$ (0.3 percent), $Sb_2O_3$ (0.2 percent). Other metal oxides, such as MgO, PbO, CdO, $B_2O_3$, $TiO_2$, and $ZrO_2$; coloring metal oxides; and the like may be added to stabilize the glass, facilitate melting, and impart color, so long as they do not exceed 10 percent.

As further characteristics of the glass material, for example, suitable thermal properties are: a distortion point of 450 to 480° C., an annealing point of 480 to 621° C., a softening point of 610 to 770° C., a glass transition temperature (Tg) of 450 to 620° C., a yield point (Ts) of 535 to 575° C., a specific gravity of 2.47 to 3.65 (g/cm$^3$), a refractive index, Nd, of 1.52300 to 1.8061, a thermal diffusion rate of 0.3 to 0.4 cm$^2$*min, a Poisson ratio of 0.17 to 0.26, a photoelasticity constant of 2.82×10E-12, a Young's modulus of 6,420 to 9,000 kgf/mm$^2$, and a coefficient of linear expansion of 8 to 10×10E-6/° C. In particular, a glass material with a distortion point of 460° C., an annealing point of 490° C., a softening point of 650° C., a glass transition temperature (Tg) of 485° C., a yield point (Ts) of 535° C., a specific gravity of 2.47 (g/cm$^3$), a refractive index, Nd, of 1.52300, a thermal diffusion rate of 0.3576 cm$^2$*min, a Poisson ratio of 0.214, a photoelasticity constant of 2.82×10E-12, a Young's modulus of 8,340 kgf/mm$^2$, and a coefficient of linear expansion of 8.5×10E-6/° C. is particularly preferred.

[Specifying the Maximum Temperature Direction in the First Aspect]

As set forth above, in a continuous heating furnace, even when the temperature of the atmosphere in the furnace is controlled so that the temperature increases in the direction of conveyance of the forming mold, for example, the temperature distribution on the forming surface of the forming mold passing through the furnace will sometimes not rise in the direction of conveyance. That is, there are cases in which the temperature distribution of the atmosphere in the furnace does not overlap the temperature distribution on the forming surface of the forming mold being conveyed through the interior of the furnace.

Accordingly, in the first aspect of the present invention, the temperature at two or more measurement points on the forming surface of the forming mold is directly or indirectly measured in one or two or more regions within a continuous heating furnace. Thus, in these regions, it is possible to specify which of different directions running from the geometric center toward the perimeter portion is being heated to the highest temperature. In the course of rotating the forming mold, it is possible to cause portions that require greater deformation (portions of high curvature) to remain for longer periods in the maximum temperature direction and vicinity thereof by controlling the angular rotation speed as set forth further below based on the direction thus specified (the maximum temperature direction) and the curvature distribution of the forming surface of the forming mold.

The region in which the temperature is measured at two or more measurement points on the forming surface of the forming mold (also called "temperature distribution measurement region", hereinafter) can be any regions within the furnace. A continuous heating furnace is normally divided into multiple zones, with the temperature being controlled within each zone. The temperature distribution measurement region is desirably provided in at least the temperature rising region that is described further below. However, the region can also be provided in each zone. It is also possible to provide a temperature measurement position in one spot in the temperature distribution measurement region and determine the temperature distribution from the results of measurement at that temperature measurement position, or to provide multiple temperature measurement positions at two or more spots and determine the temperature distribution from the average value of the results of measurement at multiple temperature measurement positions. When each zone is divided by partitions such as shutters, it is to be envisioned that the temperature distribution will vary greatly between zones, so it is desirable to conduct temperature distribution measurement in each zone in which the forming mold is rotated.

The temperature measurement can be conducted by conveying a test forming mold through the interior of a continuous heating furnace in which the temperature has been controlled in the same manner as during actual forming prior to introducing into the continuous heating furnace a forming mold with a glass material being formed disposed on the forming surface thereof; and measuring the temperature at the measurement points on the forming surface of the forming mold in the temperature distribution measurement region. Alternatively, it is possible to measure the temperature of the measurement points on the forming surface of the forming mold in the temperature distribution measurement region during passage through the furnace in actual forming.

In both of the above embodiments, the temperature at the individual measurement points can be directly measured, or the temperature at the measurement points on the forming surface of the forming mold can be indirectly measured by measuring the temperature in the vicinity of the forming surface. A contact thermometer or a noncontact thermometer can be employed as the temperature measuring apparatus. The temperature measuring apparatus is desirably a thermocouple. Specifically, K thermocouple 30 point made of platinum or the like can be employed.

The following are examples of embodiments of positioning the temperature measuring apparatus:

(1) an embodiment in which one temperature measuring apparatus is disposed in a position in contact with the forming surface of the forming mold or near the forming surface, the forming mold is rotated within the temperature distribution measurement region, and the temperature of each measurement point is sequentially measured by the temperature measuring apparatus;

(2) an embodiment in which two or more temperature measuring apparatuses are disposed in a position in contact with the forming surface of the forming mold or near the forming surface.

When conducting temperature distribution measurement during actual forming, in both of the above embodiments, the temperature measuring apparatus is desirably disposed in a position that is near the glass material but where it will not interfere with the glass material being formed. Specifically, the perimeter of the forming mold is desirable as a position for the temperature measuring apparatus, and the edge of the perimeter is preferred. However, a through-hole can be made in the interior of the forming mold somewhere other than in the geometric center of the forming surface and the temperature measuring apparatus can be disposed therein. Disposing the temperature measuring apparatus in this manner permits direct or indirect measurement of the temperature at measurement points.

Since only one temperature measuring apparatus is employed in above-described embodiment (1), the forming mold is rotated to measure the temperature at a plurality (two or more) of measurement points. The rotation can be conducted about the geometric center as axis. For example, the temperature at each of the measurement points can be sequentially measured while rotating the forming mold so that the temperature measuring apparatus contacts each measurement point or is positioned in the vicinity of each measurement point.

Two or more temperature measuring apparatuses are employed in embodiment (2). The measuring apparatuses can be disposed to measure the temperature at individual measurement points. In that case, rotation of the forming mold is not necessary for temperature measurement. However, in embodiment (2), it is also possible not to dispose a temperature measuring apparatus at each measurement point, but to rotate the forming mold to measure the temperature at each measurement point in the same manner as in embodiment (1).

Since the temperature distribution can be measured without rotating the forming mold in embodiment (2), the temperature distribution on the forming surface in the furnace is only monitored as needed, and the maximum temperature direction can be specified anew when a change exceeding a prescribed level occurs in the temperature distribution.

In both embodiments (1) and (2) above, it is possible to measure the temperature at individual measurement points on the forming surface during one rotation of the forming mold, determine the conditions of the subsequent rotation based on the measurement results, and sequentially repeat this cycle.

At least two measurement points at which the temperature is measured are established to obtain information on the temperature distribution within the surface. From the perspectives of ease of positioning the temperature measuring apparatus and reducing the impact on forming, the measurement points are desirably provided at the edge of the perimeter of the forming surface. From the perspective of obtaining precise information on the temperature distribution within the surface, measurement points are desirably established along the entire circumference of the forming surface, and measurement points are preferably established at intervals of equal angles along the entire circumference of the forming surface. For example, the temperature can be measured at 360 points at a 1° pitch. Further, the temperature distribution of the atmosphere within the furnace can be taken into account and measurement points can be provided only in areas where the presence of a high temperature portion is anticipated. For example, in the temperature rising region described further below, when a virtual line orthogonal to the direction of conveyance and passing through the geometric center of the forming surface is envisioned, the presence of a high temperature portion in the portion on the conveyance direction side as divided by the virtual line is conceivable. Thus, in this case, it suffices to provide a measurement point in just the portion on the direction of conveyance side. Further, in the temperature rising region, it is possible to provide temperature measurement points concentrated in a region with a window angle of about 45 to 180° (taking the direction of conveyance as 0°, a region of about ±22.5° to about ±90°) in the direction of conveyance through the furnace where the probability of a high temperature region is high. Additionally, there is a high probability of the presence of a high temperature portion in the direction opposite the direction of conveyance in the cooling region described further below. In this case, it is desirable to provide concentrated temperature measurement points in the opposite direction from the direction of conveyance.

The temperature distribution on the forming surface is determined by measuring the temperature at the various measurement points as set forth above. The method of specifying the maximum temperature direction from among the two or more different directions running from the geometric center of the forming surface of the forming mold toward the perimeter portion thereof based on the temperature distribution thus determined will be described next based on FIG. 3.

Figure 3:
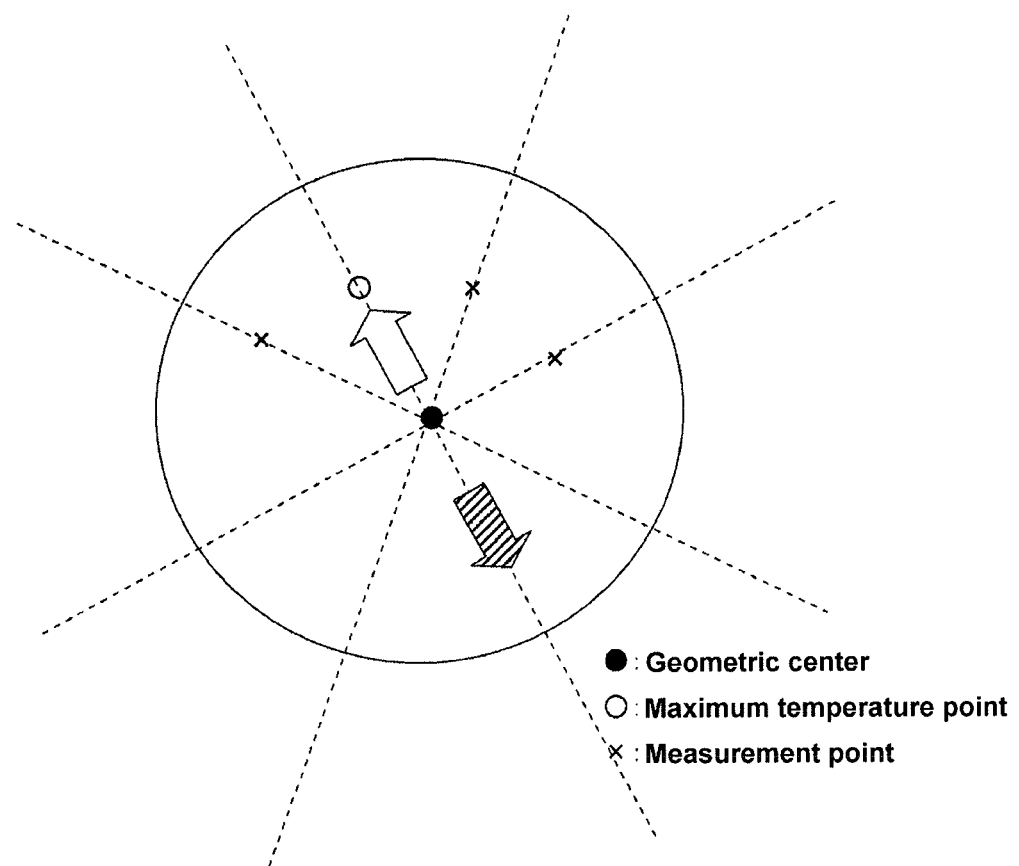
FIG. 3 is a descriptive drawing of the method of specifying the direction of maximum temperature on the forming surface.

First, the measurement point with the highest temperature (maximum temperature point) among a plurality of measurement points described above is determined by the above-described temperature measurement. Next, virtual lines (the dotted lines shown in FIG. 3) running through the geometric center and various measurement points are envisioned to specify a maximum temperature direction in the form of the direction running from the geometric center toward the maximum temperature point on a virtual line passing through the maximum temperature point. In FIG. 3, the virtual lines are shown as straight lines, but in the present invention and the reference aspect described further below, the virtual lines and the virtual axis include lines that approximate straight lines, but are not necessarily limited to straight lines.

By specifying the maximum temperature direction in this manner as well as rotating the forming mold while controlling the angular rotation speed based on information on the curvature distribution on the forming surface as set forth further below, the forming mold can be rotated so that portions that need to undergo considerable deformation remain for extended periods in high temperature areas, achieving tight adhesion to the forming surface at uniform timing.

The method of obtaining information on the curvature distribution of the forming surface will be described next.

[Specifying the Average Curvature]

A forming mold having a curvature distribution on the forming surface thereof is employed in the present invention. Accordingly, not all the average curvatures are identical, with two or more directions of different average curvatures being present among the two or more directions running from the geometric center of the forming surface toward the perimeter portion. Accordingly, in the first aspect of the present invention, as is set forth further below, the angular rotation speed of the forming mold decreases as the average curvature in the direction passing through the maximum temperature direction increases during rotation of the forming mold. Thus, the greater the average curvature of a direction, the longer the period spent in the maximum temperature direction that has been specified and in the vicinity thereof, and thus, the greater the quantity of heat that is added to portions that require considerable deformation.

Examples of the method of specifying the average curvature in various directions include: first, the method of specification based on the measurement value of the three-dimensional shape of the forming surface of the forming mold (Method 1), and second, the method of specification based on the prescription values of an eyeglass lens (Method 2). Method 2 makes it possible to specify the average curvature in various directions running from the geometric center of the forming surface to the perimeter portion based on the prescription values of the eyeglass lens, such as the axis of astigmatism, the reference point for measurement of near portion, and the reference point for measurement of far portion.

Method 1 will be described below.

The average curvature is the inverse of the radius of curvature. Thus, the average curvature in various directions can be specified by calculating the radius of curvature in various directions from the geometric center toward the perimeter portion of the forming surface and taking the inverse of the radius of curvature thus obtained.

An example of method of calculating the radius of curvature will be described below.

First, the approximate radius of curvature of the cross-section of a lens in a given direction is calculated from the coordinates of three or more points on a straight line passing through the geometric center of the forming surface of a forming mold. This calculation method is used to calculate the radii of curvature in all directions. An approximate radius of curvature is calculated either by solving simultaneous equations for three points, or by calculating an approximate radius of curvature by the method of least squares from the coordinates of three or more points.

The surface shape of the forming surface of a forming mold can be represented by means of the numeric values of the heights of the individual squares of the square-shaped rows by dividing the height of the forming surface horizontally and vertically. The B-spline function denoted by equation 1 below can be used to represent a surface shape of a free curved surface including a progressive surface to represent the values of coordinates at any position.

[Numeral 1]

$$f(x, y) = \sum_{i=1}^{h+m} \sum_{j=1}^{k+m} c_{ij} N_{mi}(x) N_{mj}(y) \quad \text{(Equation 1)}$$

In equation 1, m denotes the order (m-1: degree) of the spline function; h and k denote numbers of nodal points—2m of the spline function; $c_{ij}$ denote coefficients; and $N_{mi}(x)$ and $N_{mj}(y)$ denote B-splines of the $m^{th}$ order. For details relating to spline functions, the reference "Series: New Applications of Mathematics 20, Spline Functions and Their Applications," by Kouzo ICHIDA and Fujiichi YOSHIMOTO, published by Kyoiku Shuppan, which is expressly incorporated herein by reference in its entirety, can be consulted.

Calculation of the radius of curvature will be described next. A specific example of the method of calculation based on simultaneous equations will be given first.

Figure 4:
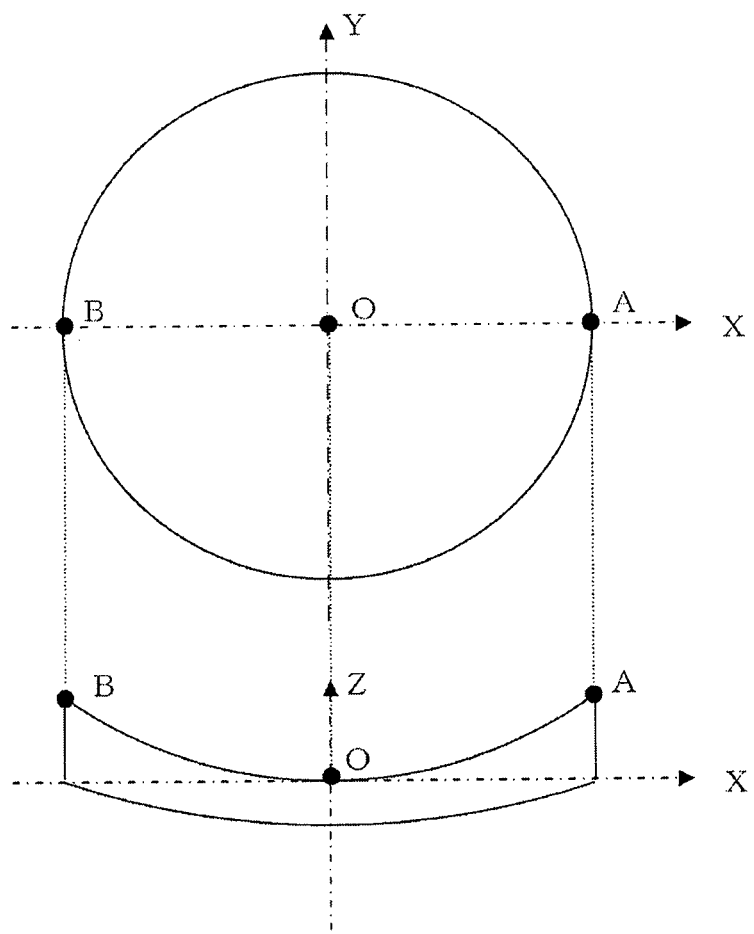
FIG. 4 is a descriptive drawing of the method of specifying the average curvature in various directions on the forming surface of a forming mold.

As shown in FIG. 4, the coordinates of three points AOB lying on a straight line that passes through the geometric center of the forming surface of a forming mold and connects the two edges are employed to calculate the approximate radius of curvature of the cross-section from simultaneous equations of circles. When the three points employed in the calculation are denoted as A(X1, Y1), O(X2, Y2), and B(X3, Y3), as shown in FIG. 4, the value of the coordinates of the ZX cross-section become A(X1, Z1), O(X2, Z2), and B(X3, Z3). To obtain the equation of a circle passing through the three points AOB, the following simultaneous equations are solved. However, there is a necessary condition that the three points not lie on a straight line in the ZX cross-section. Denoting the values of the X and Z coordinates of the center of the circle as a and b, respectively, and the radius of the circle as r gives simultaneous equations in the form of equation 2 below.

[Numeral 2]

$$(X1-a)^2 + (Z1-b)^2 = r^2$$

$$(X2-a)^2 + (Z2-b)^2 = r^2$$

$$(X3-a)^2 + (Z3-b)^2 = r^2 \quad \text{(Equation 2)}$$

Figure 5:
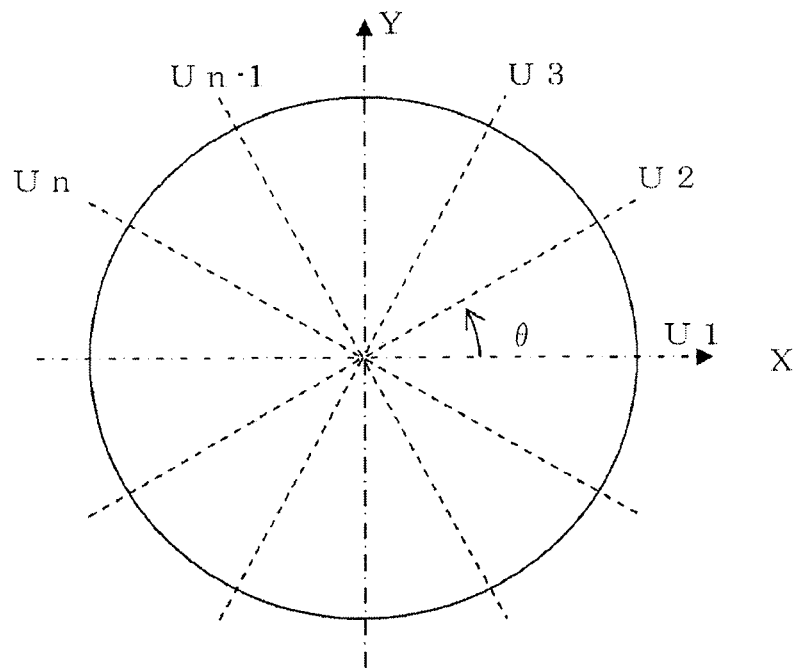
FIG. 5 is a descriptive drawing of the method of specifying the average curvature in various directions on the forming surface of a forming mold.

To determine each radius of curvature and its direction, as shown in FIG. 5, an approximate radius of curvature is calculated for the cross-sections in directions U1, U2, ... Un at a pitch of angle θ. Angle θ can be set to from 0.1 to 1°, for example.

Figure 6:
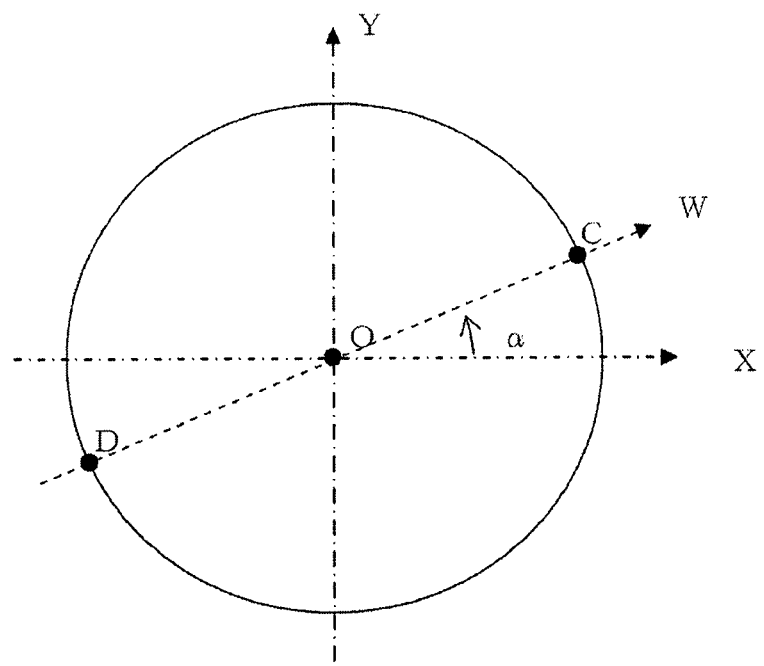
FIG. 6 is a descriptive drawing of the method of specifying the average curvature in various directions on the forming surface of a forming mold.
Figure 7:
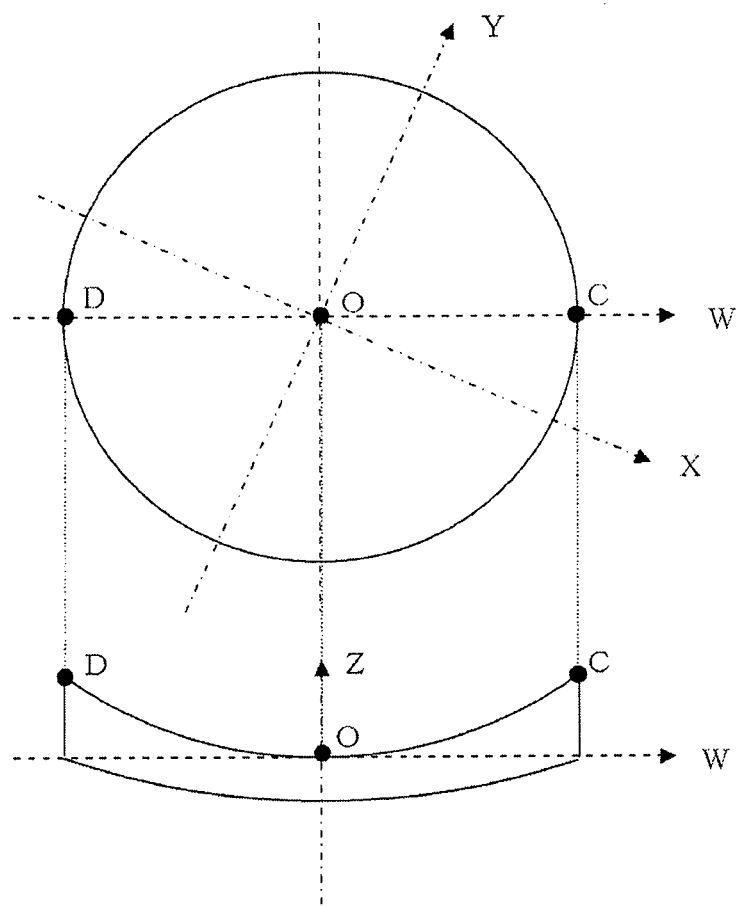
FIG. 7 is a descriptive drawing of the method of specifying the average curvature in various directions on the forming surface of a forming mold.

By contrast, as shown in FIG. 6, when the three points employed to calculate the direction of angle α are denoted as C(X1,Y1), O(X2,Y2), and D(X3,Y3), as shown in FIG. 7, the value of the coordinates of the ZW cross-section are given by C(W1, Z1), O(W2, Z2), and B(W3, Z3). The equation of a circle passing through the three points COD can be obtained by solving the simultaneous equations of equation 3 below. However, there is a condition that the three points not lie on a straight line in the ZW cross-section.

[Numeral 3]

$$(W1-a)^2 + (Z1-b)^2 = r^2$$

$$(W2-a)^2 + (Z2-b)^2 = r^2$$

$$(W3-a)^2 + (Z3-b)^2 = r^2 \quad \text{(Equation 3)}$$

In equations 2 and 3 above, a and b denote the values of coordinates W and Z, respectively, of the center of the circle; r denotes the radius of the circle; and the coordinate values W1, W2, and W3 denote identical values in all directions. Accordingly, Z1, Z2, and Z3 become as shown in equation 4 based on the B-spline function.

[Numeral 4]

$$Z1 = f(X1, Y1)$$

$$Z2 = f(X2, Y2)$$

$$Z3 = f(X3, Y3) \quad \text{(Equation 4)}$$

As an example, Table 1 shows examples of the calculation of radii of curvature in a total of 18 directions at an individual axis pitch of 10 degrees in a progressive surface using the above-described method. In Table 1, P1, P2, and P3 denote coordinate values on the axes, and the axis direction denotes the "angle (deg) formed with the X-axis direction by the cross-section being calculated."

TABLE 1

| Angle (deg) formed with the X-axis direction by the cross-section being calculated | Coordinate value at P1 point (mm) | | | Coordinate value at P2 point (mm) | | | Coordinate value at P3 point (mm) | | | Radius of curvature at Pn point (mm) | Curvature at Pn point (1/mm) |
|---|---|---|---|---|---|---|---|---|---|---|---|
| | X | Y | Z | X | Y | Z | X | Y | Z | | |
| 0 | 35 | 0 | 7.36 | 0 | 0 | 0 | −35 | 0 | 6.78 | 90.18 | 1.109E−02 |
| 10 | 34.47 | 6.08 | 7.4 | 0 | 0 | 0 | −34.5 | −6.08 | 6.94 | 88.98 | 1.124E−02 |
| 20 | 32.89 | 11.97 | 7.47 | 0 | 0 | 0 | −32.9 | −12 | 7.16 | 87.38 | 1.144E−02 |
| 30 | 30.31 | 17.5 | 7.54 | 0 | 0 | 0 | −30.3 | −17.5 | 7.4 | 85.74 | 1.166E−02 |
| 40 | 26.81 | 22.5 | 7.62 | 0 | 0 | 0 | −26.8 | −22.5 | 7.58 | 84.37 | 1.185E−02 |
| 50 | 22.5 | 26.81 | 7.71 | 0 | 0 | 0 | −22.5 | −26.8 | 7.68 | 83.48 | 1.198E−02 |
| 60 | 17.5 | 30.31 | 7.79 | 0 | 0 | 0 | −17.5 | −30.3 | 7.66 | 83.15 | 1.203E−02 |
| 70 | 11.97 | 32.89 | 7.85 | 0 | 0 | 0 | −12 | −32.9 | 7.57 | 83.3 | 1.200E−02 |
| 80 | 6.08 | 34.47 | 7.88 | 0 | 0 | 0 | −6.08 | −34.5 | 7.43 | 83.82 | 1.193E−02 |
| 90 | 0 | 35 | 7.87 | 0 | 0 | 0 | 0 | −35 | 7.3 | 84.56 | 1.183E−02 |
| 100 | −6.08 | 34.47 | 7.81 | 0 | 0 | 0 | 6.08 | −34.5 | 7.2 | 85.35 | 1.172E−02 |
| 110 | −12 | 32.89 | 7.72 | 0 | 0 | 0 | 11.97 | −32.9 | 7.16 | 86.05 | 1.162E−02 |
| 120 | −17.5 | 30.31 | 7.58 | 0 | 0 | 0 | 17.5 | −30.3 | 7.19 | 86.65 | 1.154E−02 |
| 130 | −22.5 | 26.81 | 7.39 | 0 | 0 | 0 | 22.5 | −26.8 | 7.25 | 87.29 | 1.146E−02 |
| 140 | −26.8 | 22.5 | 7.17 | 0 | 0 | 0 | 26.81 | −22.5 | 7.31 | 88.23 | 1.133E−02 |
| 150 | −30.3 | 17.5 | 6.94 | 0 | 0 | 0 | 30.31 | −17.5 | 7.33 | 89.39 | 1.119E−02 |
| 160 | −32.9 | 11.97 | 6.78 | 0 | 0 | 0 | 32.89 | −12 | 7.33 | 90.34 | 1.107E−02 |
| 170 | −34.5 | 6.08 | 6.72 | 0 | 0 | 0 | 34.47 | −6.08 | 7.34 | 90.66 | 1.103E−02 |

Figure 8:
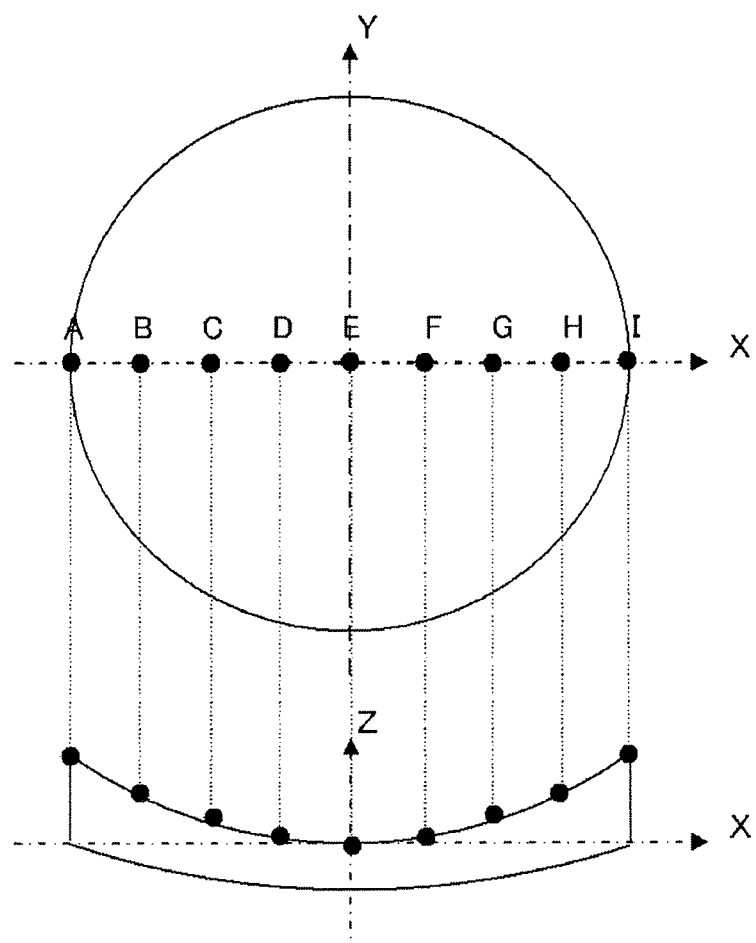
FIG. 8 is a descriptive drawing of the method of specifying the average curvature in various directions on the forming surface of a forming mold.

An example of the method of calculating coordinate values from three or more points will be described next. As shown in FIG. 8, the coordinate values of three or more points lying on a straight line that passes through the geometric center of the forming surface of a forming mold and connects the two edges are employed to calculate the approximate radius of curvature in the cross-section by the method of least squares in the equation of a circle. In the manner of points A to I in FIG. 8, when the coordinate points employed in the calculation in the form of n points, with n being 3 or greater, are denoted as (X1,Y1), (X2,Y2), . . . (Xn,Yn), as shown in FIG. 8, the coordinate values of cross-section ZX are given by (X1, Z1), (X2, Z2), . . . (Xn, Zn). The method of least squares is employed to obtain the equation of the circle that is the closest to these n coordinate values, and the simultaneous equations of equation 5 below are solved. There is a condition that not all of these points lie on a straight line within cross-section ZX. In equation 5, a and b denote the values of coordinate values X and Z, respectively, of the center of the circle, and r denotes the radius of the circle.

[Numeral 5]

$$S = \sum_{i=1}^{n} \{(Xi-a)^2 + (Zi-b)^2 - r^2\}^2 \qquad \text{(Equation 5)}$$

The equation of the circle constituting the best approximation is obtained when S in equation 5 assumes its lowest value. Accordingly, to obtain the values of a, b, and r that yield the lowest S, differentiation is conducted with a, b, and r, 0 is substituted, and a solution is obtained for these values, as shown in equation 6, below.

[Numeral 6]

$$\frac{\partial S}{\partial a} = -2 \cdot \sum_{i=1}^{n} [\{(Xi-a)^2 + (Zi-b)^2 - r^2\}(Xi-a)] = 0 \qquad \text{(Equation 6)}$$

$$\frac{\partial S}{\partial b} = -2 \cdot \sum_{i=1}^{n} [\{(Xi-a)^2 + (Zi-b)^2 - r^2\}(Zi-b)] = 0$$

$$\frac{\partial S}{\partial a} = -2 \cdot r \cdot \sum_{i=1}^{n} \{(Xi-a)^2 + (Zi-b)^2 - r^2\} = 0$$

To determine the radius of curvature and its direction, as shown in FIG. 5, an approximate radius of curvature is calculated for the cross-sections in directions U1, U2, . . . Un at a pitch of angle θ. Angle θ can be set to 1°, for example.

Figure 9:
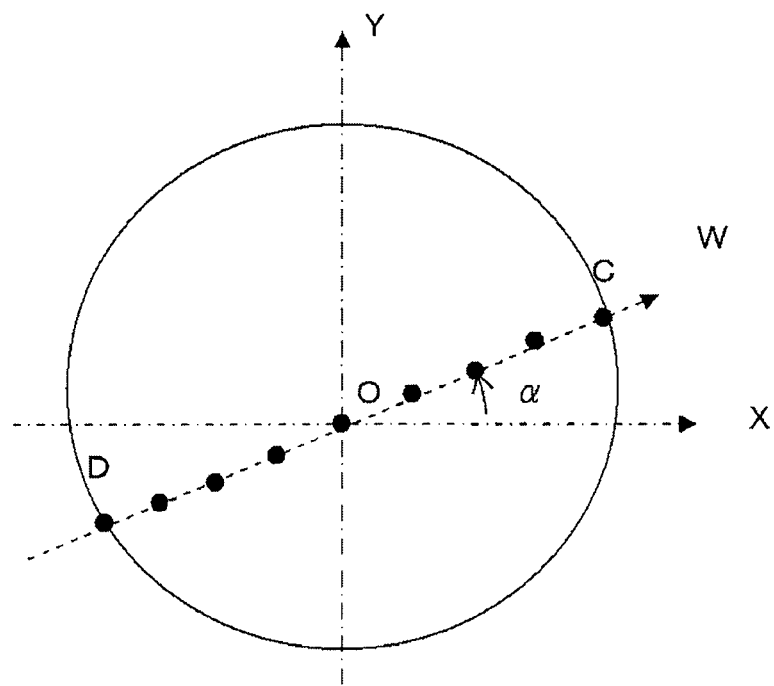
FIG. 9 is a descriptive drawing of the method of specifying the average curvature in various directions on the forming surface of a forming mold.
Figure 10:
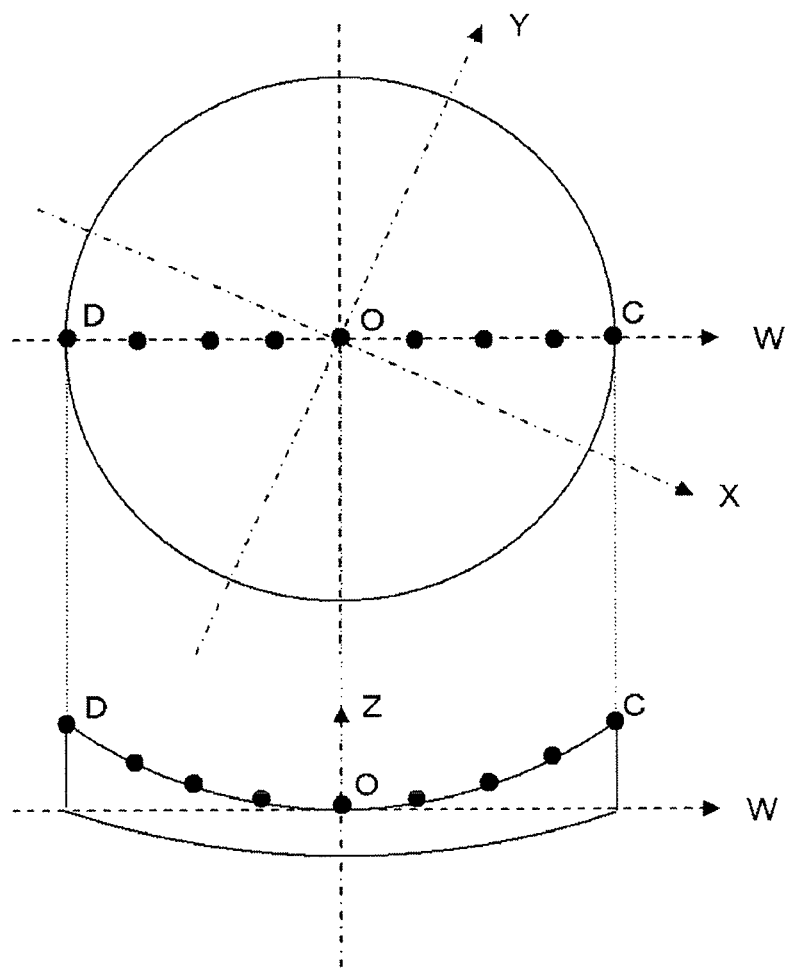
FIG. 10 is a descriptive drawing of the method of specifying the average curvature in various directions on the forming surface of a forming mold.

As shown in FIG. 9, when the n coordinate points used to calculate the direction of angle α are denoted as (X1, Y1), (X2, Y2), . . . (Xn, Yn), as shown in FIG. 10, the value of the coordinates of cross-section ZW are given by (W1, Z1), (W2, Z2), . . . (Wn, Zn). The equation of the circle the closest to these n coordinate values can be obtained by solving the following simultaneous equations by the least squares method. However, there is a condition that not all of the points lie on a straight line in the ZW cross-section. Equation 7 below is obtained by denoting the coordinate values W and Z of the center of the circle as a and b, respectively, and denoting the radius of the circle as r.

[Numeral 7]

$$S = \sum_{i=1}^{n} \{(Wi-a)^2 + (Zi-b)^2 - r^2\}^2 \qquad \text{(Equation 7)}$$

The equation of the circle constituting the best approximation is obtained when S assumes its lowest value. Accordingly, to obtain the values of a, b, and r yielding the lowest S, differentiation is conducted with a, b, and r, 0 is substituted, and a, b, and r are calculated from the following simultaneous equations (equation 8).

[Numeral 8]

$$\frac{\partial S}{\partial a} = -2 \cdot \sum_{i=1}^{n} [\{(Wi-a)^2 + (Zi-b)^2 - r^2\}(Wi-a)] = 0$$

$$\frac{\partial S}{\partial b} = -2 \cdot \sum_{i=1}^{n} [\{(Wi-a)^2 + (Zi-b)^2 - r^2\}(Zi-b)] = 0$$

$$\frac{\partial S}{\partial a} = -2 \cdot r \cdot \sum_{i=1}^{n} \{(Wi-a)^2 + (Zi-b)^2 - r^2\} = 0$$

(Equation 8)

In this context, the values of coordinates W1, W2, and W3 are made identical in all directions. The various Z values (Z1, Z2, Z3) are obtained from the B-spline function (equation 9 below).

[Numeral 9]

$Z1 = f(X1, Y1)$ $Z2 = f(X2, Y2)$ $Z3 = f(X3, Y3)$ (Equation 9)

In the same manner as the calculation performed for three points based on the above method, the approximate radius of curvature can be calculated using 4 or more points. Alternatively, 3 or more coordinate values—for example, four coordinate values—can be positioned on a line segment in the form of a straight line running between the geometric center of the forming surface of a forming mold and an edge, and the approximate radius of curvature in the cross-section thereof can be calculated. The average curvature can be specified as the inverse of the radius of curvature thus calculated, that is, 1/(the radius of curvature).

Figure 11:
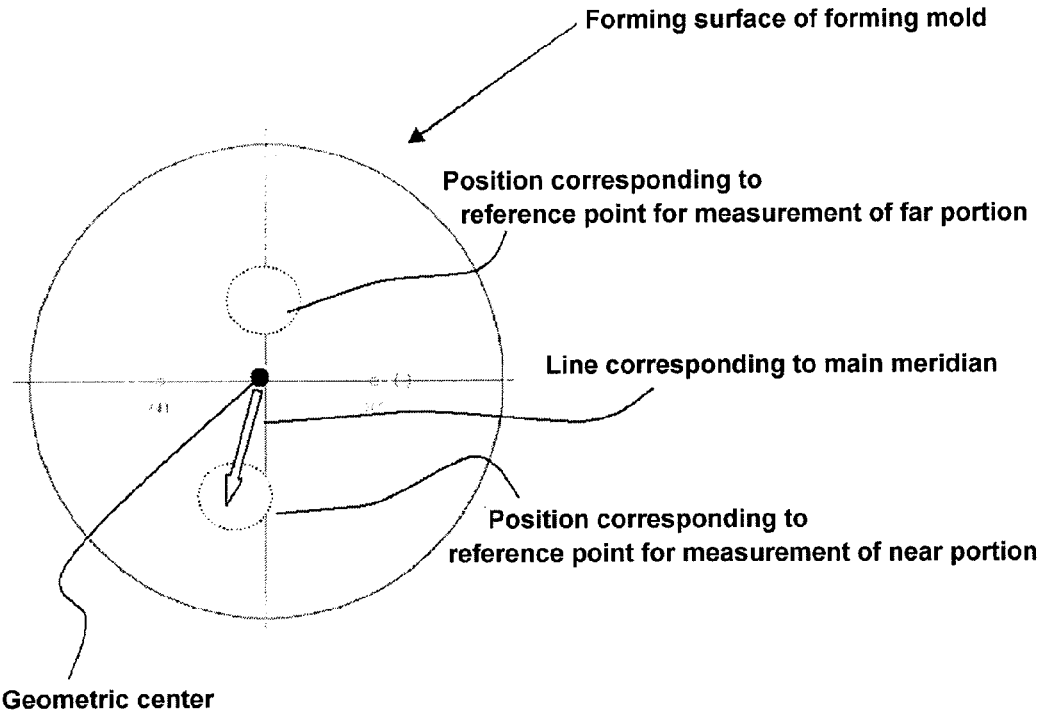
FIG. 11 shows an example of the arrangement of the position corresponding to a reference point for measurement of far portion and the position corresponding to a reference point for measurement of near portion on the forming surface of the forming mold.

JIS T7315, JIS T7313, and JIS T7330 specify reference points for measurement of the dioptric power as reference points for measurement of the refractive indexes of eyeglass lenses. The reference points for the measurement of dioptric power are portions that are enclosed by circles about 8.0 to 8.5 mm in diameter, for example, on the surface on the object side or on the eyeball side of an eyeglass lens. In a progressive dioptric power lens that can be molded by the casting mold manufactured by the present invention, there are two dioptric power measurement reference points in the form of a reference point for measurement of far portion and a reference point for measurement of near portion. The intermediate region positioned between the reference point for measurement of far portion and the reference point for measurement of near portion in a progressive dioptric power lens is called the progression band. Within this band, the dioptric power varies progressively. The reference point for measurement of near portion is located at a position corresponding to the convergence of the eyeballs at a position either to the right or to the left of the main meridian, and is determined to be positioned either to the right or left of the main meridian based on the right and left partitioning of the eyeballs. When the glass material is formed into a casting mold by the hot sag forming method, the surface that was the upper surface of the glass material (the opposite surface from the surface in tight contact with the forming surface) is transferred to the eyeglass lens. The phrase "the position corresponding the reference point for measurement of dioptric power" of the forming surface of the forming mold refers to the portion coming into tight contact with the lower surface of the glass material, desirably opposing in the normal direction the portion of the upper surface of the glass material becoming the portion that is transferred to the reference point for measurement of dioptric power of the eyeglass lens on the surface of the casting mold that is manufactured. FIG. 11 shows an example of the arrangement of the "position corresponding to a reference point for measurement of far portion" and the "position corresponding to a reference point for measurement of near portion" on the forming surface of the forming mold.

For example, in the embodiment shown in FIG. 11, the direction running from the geometric center toward a position corresponding to the reference point for measurement of near portion (the direction indicated by the hollow white arrow in FIG. 11) is the direction in which the average curvature is the greatest. Based on the present invention as set forth further below, by rotating the forming mold at an angular rotation speed based on the average curvature, it is possible to rotate the forming mold so that the angular rotation speed is minimized in the course of approximately overlapping the direction from the geometric center toward a position corresponding to the reference point for measurement of near portion with the maximum temperature direction. In the present invention and in the reference aspect described further below, the "approximate" used in the course of specifying a positional relation in two directions and in relation to angles includes differences of equal to or less than about ±5° relative to some direction or angle that is adopted as 0°.

[Rotation of the Forming Mold in the First Aspect]

In the first aspect, an approximate full circle rotation of the forming mold in at least some region of a continuous heating furnace is continuously or intermittently repeated. Rotating the forming mold in this manner generates a rotational moment in the glass material on the forming surface. In this process, a force that maintains the direction of the rotational moment is exerted on the glass material. Viewed macroscopically, a lens with center symmetry can maintain surface symmetry even upon deformation, which leads to a reduction in AS (astigmatisms) caused by asymmetry in the deformed shape. Rotation of the forming mold is desirably conducted about the geometric center as axis. Further, rotation of the forming mold can be conducted in a single direction, or can be conducted by suitably combining reverse rotation. For example, after approximately full circle rotation in a given direction (positive direction), approximately full circle rotation can be conducted in the opposite direction, and the cycle repeated. The above rotation of the forming mold is identical in the second aspect, as well.

The above rotation of the forming mold is conducted so that the angular rotation speed of the forming mold decreases as the average curvature in the $n^{th}$ direction running through the maximum temperature direction increases in a single rotation in the region in which the maximum temperature direction has been specified (the temperature distribution measurement region). In this context, n denotes an integer specifying each direction among the directions of which average curvatures have been specified without overlapping of the number n. For example, take the case where average curvatures are specified in three directions. The directions in which average curvatures have been designated are specified as the first direction (n=1), second direction (n=2), and third direction (n=3). Controlling the angular rotation speed based on the average curvature in the directions passing through the maximum temperature direction in this manner makes it possible to cause portions that require considerable deformation to remain longer in high temperature directions and to receive a greater quantity of heat. Thus, the timing with which the lower surface of the glass material is brought into tight contact with the forming surface of the forming mold can be synchronized in various portions within the surface by heat-softening the glass material. In the first aspect, rotation of the forming mold is continuously or intermittently repeated. That is, rotation is repeatedly conducted. This repeated rotation can be conducted under identical rotation conditions each time, or can be conducted under differing rotational conditions. In both embodiments, it suffices to control the angular rotation speed as set forth above during each rotation.

The method of employing a relational expression making it possible to set the angular rotation speed of the forming mold at which the maximum temperature direction approximately overlaps the $n^{th}$ direction so that this speed decreases as the average curvature in the $n^{th}$ direction increases is suitable as the method of controlling the angular rotation speed as set forth above.

Equation A below can be employed as the above relational expression:

$$\omega \cdot AC_n = k \qquad \text{Equation A}$$

(In equation A, $\omega$ denotes the angular rotation speed of the forming mold as the $n^{th}$ direction passes through the maximum temperature direction; $AC_n$ denotes the average curvature in the $n^{th}$ direction; and k denotes an approximate constant.)

A value of about 0.1047 to 6.282 rad/s (from one rotation per minute to one rotation per second) is desirable as $\omega$, and about 0.01047 to 31.41 rad/s is also desirable. The k in equation A is an approximate constant that can be set as desired. It is desirably set based on the maximum and minimum values of the average curvature on the forming surface so that $\omega$ falls within the above desirable range of $\omega$. The approximate constant refers to a constant that varies by ±10 percent. When the angular rotation speed becomes excessively high, the glass material that is placed on the forming surface will sometimes slip, depending on the coefficient of friction of the forming surface and the lower surface of the glass material. In such cases, it is desirable to set approximate constant k so that $\omega$ becomes relatively low within the above suitable range. Although also depending on the shape of the forming surface of the forming mold (the maximum and minimum values of the average curvature) and the coefficient of friction of the forming surface and the lower surface of the glass material, approximate constant k can be set to within a range of 0.01 to 314.1, for example.

As set forth above, determining the angular rotation speed of the forming mold based on the average curvature in the direction passing through the maximum temperature direction makes it possible to control rotation so that the angular rotation speed is minimized when the direction from the geometric center of the forming surface of the forming mold toward the portion of greatest curvature on the forming surface passes through the maximum temperature direction. Controlling rotation in this fashion makes it possible to apply more heat and deform greater the higher the curvature of the particular portion on the forming surface, and makes it possible to achieve uniform timing of tight contact between the forming surface and the lower surface of the glass material. As a result, the difference in time required to complete deformation in all regions of the glass material can be decreased, deformation can be conducted in a center symmetric manner, and the generation of AS (astigmatisms) accompanying non-uniform deformation can be avoided. Further, the deformation times of portions of considerable curvature, which had been rate controlling until now, can be reduced, permitting a reduction in the total deformation (processing) time and shorting the processing time.

[Controlling the Temperature of a Continuous Heating Furnace in the First Aspect]

A description of how to control the temperature of a continuous heating furnace will be given next.

The term "continuous heating furnace" means a device that has an inlet and an outlet and conducts thermal treatment by causing an item being processed to pass through the interior of a furnace with a set temperature distribution by means of a conveyor device such as a conveyor. In a continuous heating furnace, multiple heaters devised by taking into account heat emission and radiation, and a control mechanism for air circulation within the furnace, can be used to control the temperature distribution within the furnace. Normally, the heaters are disposed in the upper and lower portions of the conveyance route through the interior of the furnace. However, a region in which heat sources are disposed on both lateral surfaces can be provided in at least a portion of the furnace.

PID controls can be employed in temperature control by each sensor and heater of the continuous heating furnace. PID controls are a control method for detecting deviation between a programmed target temperature and the actual temperature and restoring (feedback) the deviation from the target temperature to 0. PID controls are a method of obtaining an output in "Proportional", "Integral", "Differential" manner when calculating from the deviation. The general equation of PID controls is given below.

[Numeral 10]

General equation of PID controls:

$$y = K_P\left(e + K_I \int e\, dt + K_D \frac{d}{dt}e\right)$$

P term:

$$K_P \cdot e_n$$

I term:

$$\int e\, dt = \lim_{\Delta t \to 0}\left(\sum_{i=0}^{n} e_i \Delta t\right) = \Delta t \Sigma e_n$$

D term:

$$\frac{d}{dt}e = \lim_{\Delta t \to 0}\left(\frac{\Delta e}{\Delta t}\right)$$

as $\Delta e = e_n - e_{n-1}$ $$\frac{1}{\Delta t}(e_n - e_{n-1})$$

Thus:

$$y = K_P\left[e_n + K_I \Delta t \Sigma e_n + \frac{K_D}{\Delta t}(e_n - e_{n-1})\right]$$

In the above equations, e denotes deviation, K denotes gain (the gain with the subscript P denotes proportional gain, the gain with the subscript I denotes integral gain, and the gain with the subscript D denotes differential gain), $\Delta t$ denotes the sample time (sampling time, control frequency), and subscript n denotes the current time.

Using PID controls makes it possible to increase the precision with which the temperature is controlled within the furnace for changes in the heat quantity distribution based on the shape and quantity of inputted pieces to be processed. A nonsliding system (for example, a walking beam) can be adopted for conveyance within the electric furnace.

The continuous heating furnace need only be capable of effecting the desired temperature control, but is desirably a continuous feed-type electric furnace. For example, a continuous feed-type electric furnace can be employed in which the conveyance system is a nonsliding system, the temperature controls are PID temperature controls, the temperature measurement device is "K thermocouple 30 point made of platinum", a maximum use temperature is 800° C., the commonly employed temperature ranges from 590 to 650° C., the internal atmosphere is a dry air (free of oil and dust), the atmospheric control is in the form of an inlet air curtain, internal furnace purging, and an outlet air curtain, and the temperature control precision is ±3° C., and the cooling system is air cooling. Suction parts for suction, described further below, can be provided at 3 positions within the furnace.

In a continuous heating furnace, radiation from the heat sources within the furnace and radiating heat generated by secondary radiation from the interior of the furnace can heat the glass material to a desired temperature. The temperature of the continuous heating furnace is desirably controlled so that a temperature rising region having a temperature distribution where the temperature rises in the conveyance direction of the forming mold is contained in the present invention. In the temperature rising region, the glass material being formed can be heated to a temperature at which the glass material on the forming mold is capable of deforming, desirably to a temperature at which the upper surface temperature of the glass material being formed reaches the glass transition temperature Tg-100° C. or greater of the glass constituting the glass material, preferably (Tg-50° C.) or greater, and more preferably, the glass transition temperature or greater. The temperature rising region can be a prescribed region beginning at the inlet of the continuous heating furnace. In the first aspect, at least the temperature rising region is desirably made a temperature distribution measurement region within which the rotation of the forming mold is desirably controlled. This is because this is the region where softening and deformation on the forming mold progress the most. Controlling rotation of the forming mold described above is preferably also conducted after the temperature rising region in the constant temperature maintenance region and cooling region. When rotation is controlled in multiple regions, approximate constant k in equation A above can be changed for each region to set the angular rotation speed based on the heating temperature in each region. For example, in response to the average temperature in each zone, k can be changed (set low) to change (lower) the average value of the angular rotation speed. In zones at or below a certain temperature, k is suitably set to 0, at which no rotation occurs, to stop rotation. In the second aspect described further below, the forming surface temperature distribution measurement position is desirably provided in at least the temperature rising region and rotation of the forming mold in that region is desirably controlled. As set forth above, this is because this is the region where softening and deformation on the forming mold progress the most.

Within the continuous heating furnace, temperature control is desirably effected so as to comprise, from the inlet (forming mold introduction inlet) side, a temperature rising region, a constant temperature maintenance region, and a cooling region. The glass material passing through the interior of a furnace having such temperature control is heated to a temperature at which it is capable of deforming in the temperature rising region, the formation of the upper surface of the glass material is progressed in the constant temperature maintenance region. Then, the glass material is cooled in the cooling region and discharged to the exterior of the furnace. It suffices to set the length of each region, the conveying speed in each region, and the like based on the total length of the conveyance route of the furnace and the heating program.

In the constant temperature maintenance region, the temperature of the glass material is desirably maintained at a temperature greater than or equal to the glass transition temperature of the glass constituting the glass material being formed. The temperature of the glass material in the constant temperature maintenance region desirably exceeds the glass transition temperature, but is desirably lower than the glass softening temperature from the perspective of forming properties. The temperature of the glass material does not necessarily have to be continuously kept constant in the constant temperature maintenance region; within this region, the temperature of the glass material can vary by about 1 to 15° C. Additionally, the glass material that has been formed in the constant temperature maintenance region is desirably gradually cooled to room temperature in the cooling region. The heating and cooling temperatures described below refer to the temperature of the upper surface of the glass material. The temperature of the upper surface of the glass material can be measured with a contact or non-contact-type temperature gauge, for example.

In the present invention, the glass material is placed on the forming surface of the forming mold prior to forming. The glass material can be positioned on the forming mold so that at least a portion of the rim of the lower surface of the glass material comes into contact with the forming surface and the center portion of the lower surface of the glass material is separated from the forming mold. The forming mold employed in the present invention has a forming surface of varying curvature within the surface as set forth above. To stably position a glass material with a lower surface that is spherical in shape on such a forming surface, the glass material is desirably positioned so that at least 3 points on the rim of the lower surface come into contact with the forming surface. When manufacturing a progressive dioptric power lens casting mold, it is further desirable for the glass material to be positioned on the forming mold so that at least, on the lower surface rim portion of the glass material, two points that are positioned on a side corresponding to the reference point for measurement of far dioptric power of the progressive dioptric power lens and one point that is positioned on a side of the reference point for measurement of near dioptric power are in contact with the forming surface. When the glass material is formed into a formed article (a casting mold or the portion thereof), the surface that was the upper surface of the glass material (the opposite surface from the surface in tight contact with the forming surface) is transferred to the progressive dioptric power lens. The "position corresponding to the reference point for measuring the dioptric power" of the lower surface of the glass material is a portion of the lower surface of the glass material opposite the portion of the upper surface of the glass material serving as the portion that is transferred to the reference point for measuring the dioptric power of the progressive dioptric power lens on the surface of the casting mold obtained. To stably position the glass material on the forming surface with the above three points as support points, it is desirable to form the lower surface of the glass material into a spherical shape having an average curvature that is roughly identical to the average curvature at the reference point for measuring the far dioptric power of the progressive dioptric power lens that is to be finally obtained.

Figure 12:
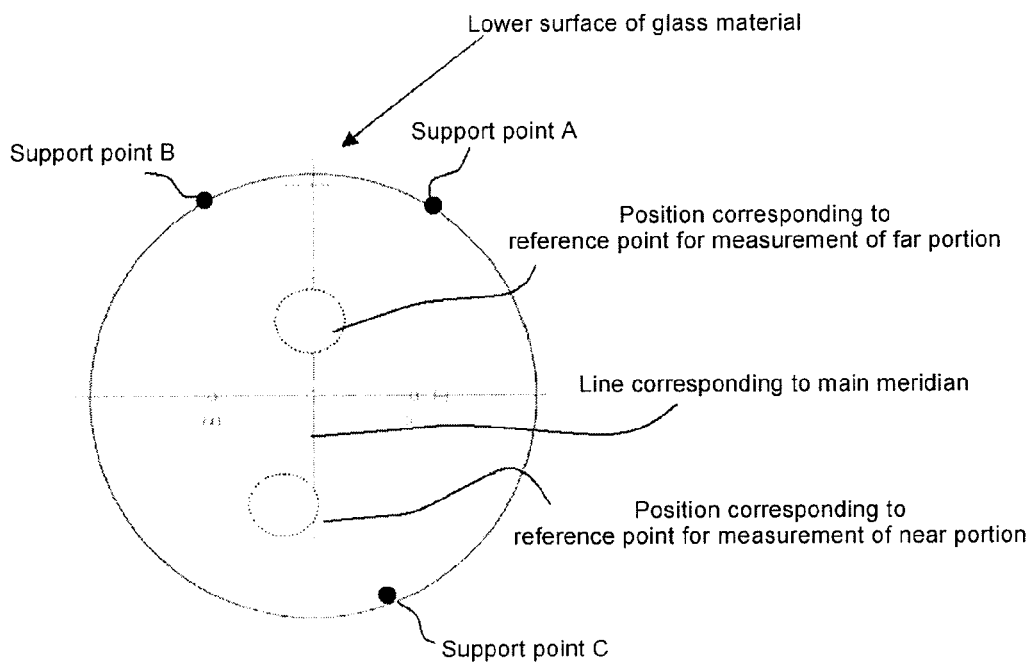
FIG. 12 is a descriptive drawing of contact between the forming surface of a forming mold and the lower surface of a glass material for manufacturing a casting mold for progressive dioptric power lenses.

FIG. 12 is a descriptive drawing of the contact between the lower surface of the glass material for manufacturing a casting mold of progressive dioptric power lenses and the forming surface of the forming mold. In FIG. 12, support points A, B, and C are contact points of the lower surface of the glass material with the forming surface. In FIG. 12, support points A and B, which lie above a line corresponding to the lens horizon (also referred to as the "horizontal reference line" or "principal longitude") running through two alignment reference points, are two points positioned on the side corresponding to reference points for measurement of the far dioptric power, and support point C, which is lower than the meridian, is a point positioned on the side corresponding to a reference point for measurement of the near dioptric power. As shown in FIG. 12, the two points positioned on the side corresponding to reference points for measurement of the far dioptric power are desirably positioned symmetrically about the line corresponding to the main meridian that runs through the reference point for measurement of the far dioptric power of the progressive dioptric power lens on the lower surface of the glass material. Further, the support point on the side corresponding to the reference point for measurement of the near dioptric power is desirably positioned on the opposite side from the reference point for measurement of the near dioptric power relative to the line corresponding to the main meridian as shown in FIG. 12. The "line corresponding to the main meridian running through the reference point for measurement of the far dioptric power" on the lower surface of the glass material refers to the portion on the lower surface of the glass material opposite the portion on the upper surface of the glass material becoming the portion that is transferred to the portion in which the main meridian of the progressive dioptric power lens is positioned on the surface of the casting mold.

The embodiment in which, at least three points are contact (support) points is described above; however, there may be four or more contact points.

In the present invention, it is possible that a covering member is placed over the forming mold on which the glass material has been positioned and the exposed portion on the forming surface side of the forming mold upon which the glass material has been positioned is covered. Thus, the upper surface of the glass material can be prevented from contamination by foreign matter such as airborne dust and debris in the furnace as it passes through the interior of the continuous heating furnace. Details of an covering member that can be employed in the present invention are described in WO 20071058353A1, for example.

The continuous heating furnace employed in the present invention desirably comprises a rotating mechanism capable of 360° rotation to permit the above-described rotation. For example, a rotating shaft can be provided in the base (support base) on which the forming mold is positioned so that the shaft is positioned in the geometric center of the forming mold. The rotating shaft can be linked to a drive motor outside the furnace to permit the transmission of a drive force and control. Effecting this control with a stepping motor and sequencer permits ready control of rotational speed, angle, rotational direction, and the like. The rotating mechanism can be disposed at any position within the furnace.

To increase the forming rate of glass material in a continuous heating furnace and enhance production efficiency, a forming mold having through-holes running from the forming surface to the opposite surface from the forming surface can be employed to apply suction through the through-holes during forming. A forming mold having through-holes is described in detail in WO 2007/058353A1. The temperature region in which a pronounced deformation-enhancing effect can be achieved by suction is normally the constant temperature maintenance region. Thus, suction is desirably conducted in the constant temperature maintenance region in the present invention.

[Measurement of Temperature Distribution on the Forming Surface in the Second Aspect]

In the second aspect of the present invention, a forming surface temperature distribution measurement position is provided in the continuous heating furnace. The operation in the forming surface temperature distribution measurement position will be described below.

A forming surface temperature distribution measurement position can be provided at any position in the continuous heating furnace. Providing it in a region in which softening and deformation of the glass material being formed progress markedly is effective. From this perspective, the forming surface temperature distribution measurement position is desirably provided in a region where the temperature on the surface of the glass material being formed reaches the glass transition temperature Tg-100° C. or greater of the glass, preferably in a region where it reaches (Tg-50° C.) or greater. The position at which the temperature of the upper surface of the glass material being formed peaks in the continuous heating furnace is even more preferably contained in a region where rotation is controlled, as set forth further below. This is because, as described above for the first aspect, since softening of the glass progresses the most at the position where the peak temperature is reached, controlling rotation of the forming mold based on the temperature gradient on the forming surface in the region containing this position can maximize the effect of the present invention.

A forming surface temperature distribution measurement position is provided at one or more spots, desirably two or more spots, within the furnace. At each position, the temperature is measured at multiple measurement points on the forming surface of the forming mold. This makes it possible to obtain information on the temperature gradient on the forming surface. Among the multiple measurement points, the side of the measurement point with the highest temperature (high temperature portion) is specified. By lowering the angular rotation speed as the portion requiring the greatest deformation of the glass material passes through the high temperature portion during each horizontal rotation of the forming mold, variation can be reduced in the timing at which the lower surface of the glass material being formed tightly contacts with the forming surface of the forming mold and thus deformation can be controlled. When the variation in the timing at which the lower surface of the glass material tightly contacts with the forming surface differs greatly at various portions in the surface, astigmatisms that are not necessary for eyeglass correction are sometimes produced, errors relative to design values sometimes generate asymmetry, and the wear sensation of the eyeglass sometimes deteriorates. By contrast, since the second aspect of the present invention makes it possible to reduce variation in the timing of this tight contact, a casting mold capable of molding eyeglass lenses affording good wear sensation can be obtained.

The high temperature portion is determined as follows.

First, a forming mold is conveyed into the furnace with a temperature measuring apparatus positioned in contact with the forming surface or in the vicinity of the forming surface. The details of the temperature measuring apparatus are identical to those set forth in the first aspect above.

The following are embodiments of positioning the temperature measuring apparatus:

(1)' an embodiment in which one temperature measuring apparatus is positioned in contact with the forming surface or in the vicinity of the forming surface, the forming mold is rotated within the region for controlling rotation of the forming mold, and the temperature at each measurement point is sequentially measured by the temperature measuring apparatus;

(2)' an embodiment in which two or more temperature measuring apparatus are positioned in contact with the forming surface or in the vicinity of the forming surface.

In both embodiments, the temperature measuring apparatus is desirably positioned as set forth in the first aspect. Embodiment (1)' can be conducted in the same manner as embodiment (1), and embodiment (2)' can be conducted in the same manner as embodiment (2). Based on embodiment (2)', the temperature distribution can be measured without rotating the forming mold, so the temperature distribution can be monitored as needed and the rotation conditions can be reset when a change in the temperature distribution exceeding a prescribed value is produced.

In both embodiments (1)' and (2)', the various measurement points on the forming surface can be measured while the forming mold is being rotated once, the rotation conditions for the next rotation can be determined based on the measurement results, and this cycle can be sequentially repeated.

In the second aspect, as well, at least two measurement points at which the temperature is measured are established to obtain information on the temperature gradient on the surface. From the perspectives of the ease of positioning the temperature measuring apparatus and reducing the effect on forming, the measurement points are desirably provided along the edge of the perimeter portion of the forming surface. From the perspective of obtaining information on the temperature gradient on the surface with good precision, the measurement points are desirably set along the entire circumference of the forming surface, and preferably set at intervals of equal angles along the entire circumference of the forming surface. For example, the temperature can be measured at 360 points at a 1° pitch. Alternatively, to position the portion requiring the greatest deformation on the high temperature portion of the forming surface, a measurement point can be provided in just the portion on the conveyance direction side in the temperature rising region, described further below, as divided in two by a virtual line orthogonal to the conveyance direction and passing through the geometric center of the forming surface. This is conceivable because the high temperature portion is normally contained in this portion of the temperature rising region. Other details relating to the temperature measurement point are identical to those of the first aspect.

The point with the highest temperature (maximum temperature point) among the various measurement points is determined by the above-described measurement. The method of determining the portion containing the maximum temperature point as the high temperature portion and the other portion as the low temperature portion will be described next based on FIG. 21.

Figure 21:
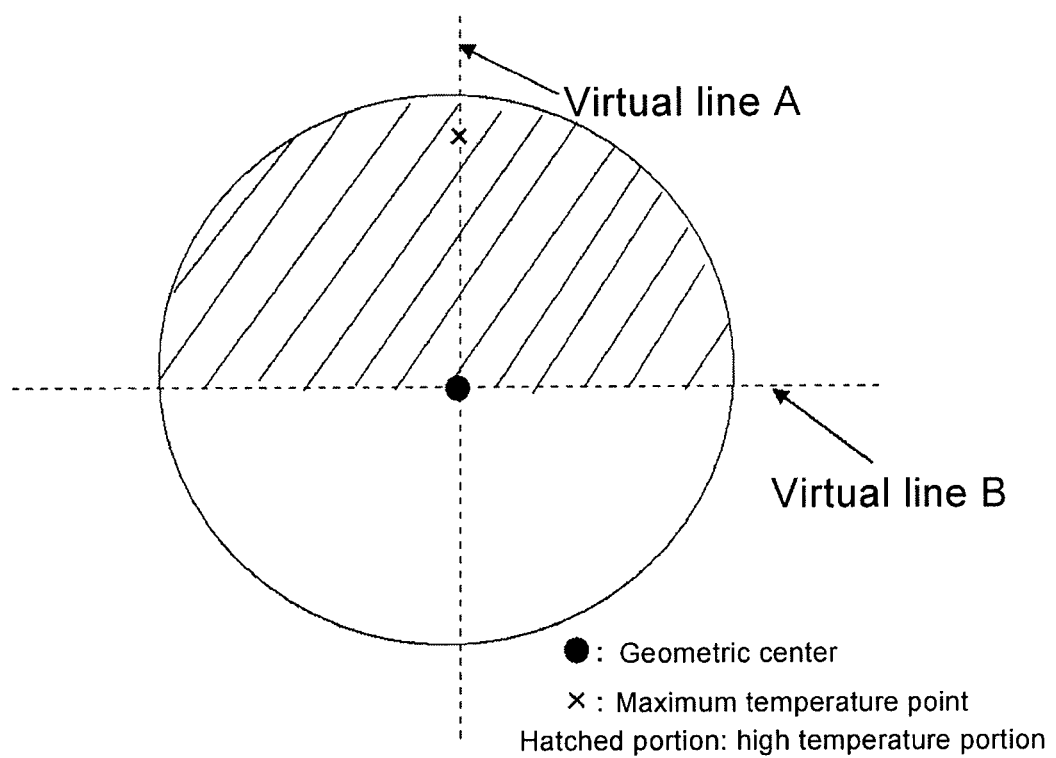
FIG. 21 is a descriptive drawing of the method of determining the high temperature portion on the forming surface.

First, a virtual line (virtual line A), running through the maximum temperature point and the geometric center, is specified. Next, a virtual line (virtual line B), orthogonal to virtual line A and running through the geometric center, is specified. As shown in FIG. 21, virtual line B divides the forming surface in two. Of the two portions thus divided in two, the portion containing the maximum temperature point (the hatched portion in FIG. 21) is heated to a higher temperature than the other portion, so this portion is determined to be the high temperature portion and the other portion to be the low temperature portion.

Next, the forming mold is rotated at an angular rotation speed that is lower when the portion of maximum curvature on the forming surface is in the high temperature portion than when this portion is in the low temperature portion in the course of one horizontal rotation of the forming mold. Thus, the portion that requires greater deformation can be positioned for an extended period on the high temperature side, and uniform timing of tight contact with the forming surface can be achieved in the surface. In the second aspect, such rotation is continuously or intermittently repeated.

The interior of a continuous heating furnace is normally divided into multiple zones, with the temperature being controlled in each zone. The forming surface temperature distribution measurement position is desirably provided in at least the temperature rising region, described further below, but can be provided in each zone. Further, it suffices to provide the forming surface temperature distribution measurement position in at least one spot in a continuous heating furnace, but such positions can also be provided in two or more spots. When individual zones are partitioned with shutters or the like, it is to be envisioned that the temperature distribution will vary greatly between zones. Further, the temperature distribution tends to become nonuniform in the vicinity of partitions, so it is desirable to conduct temperature measurement in front of and behind the partitions and determine angular rotation speeds. When forming surface temperature distribution measurement positions are provided in two or more spots, in the region between two measurement positions, it is desirable to rotate the forming mold while maintaining the angular rotation speed determined based on the measurement results at the preceding measurement position.

The portion of maximum curvature can be the portion corresponding to the portion for molding near portion on the forming surface of the forming mold. More particularly, it can be the position corresponding to the reference point for measurement of near portion in the forming surface of the forming mold. The details of the reference point for measurement of the refractive index of an eyeglass lens are as set forth above.

As described above, the angular rotation speed while the portion of maximum curvature on the forming surface is passing through the high temperature portion specified by the above-described method is made lower than the angular rotation speed while it is passing through the low temperature portion specified by the same method. Thus, as set forth above, it becomes possible to distribute a suitable quantity of heat based on the processing shape. As an example of one embodiment of controlling the angular rotation speed, the angular rotation speed while the portion of maximum curvature on the forming surface is passing through the high temperature portion and the angular rotation speed while it is passing through the low temperature portion are varied, and the angular rotation speed during each period is kept constant. That is, the angular rotation speed during a single rotation of the forming mold is varied in two stages.

For more suitable heat distribution, the forming mold is desirably rotated so that the angular rotation speed during a single rotation is minimized when the direction from the geometric center toward the maximum temperature point on virtual line A, also referred to as the "high heat direction", hereinafter, approximately overlaps the direction, also referred to as the "maximum average curvature direction", hereinafter, on which the average curvature from the geometric center of the forming surface toward the perimeter portion peaks. The direction on which the average curvature from the geometric center of the forming surface of the forming mold toward the perimeter portion peaks is the direction indicated by the hollow white arrow on the forming surface in the embodiment shown in FIG. 11, for example. That is, it is the direction from the geometric center toward a position corresponding to the reference point for measurement of near portion. This is the direction in which the curve is the sharpest on the forming surface. Thus, minimizing the angular rotation speed when this direction approximately overlaps the high temperature direction during rotation of the forming mold is desirable to synchronize the timing at which the glass material tightly contacts with the forming surface by causing maximum deformation of the portion requiring considerable deformation. The term "approximately overlaps" includes cases where the difference is about ±5° or less.

Examples of methods for determining the maximum average curvature direction are, first, the method of specification by calculating the direction of maximum curvature by measurement of the three-dimensional shape of the forming surface of the forming mold (Method 1) and, second, the method of specification from the prescription values of the eyeglass lens based on the axis of astigmatism, the reference point for measurement of near portion, and the reference point for measurement of far portion (Method 2). The details of Methods 1 and 2 are as set forth for the first aspect above.

Desirable embodiments for determining the angular rotation speed will be described next.

To determine the angular rotation speed of the forming mold, it is desirable to obtain the correlation between positions on a circle and the temperatures at these positions by measuring the temperature at multiple measurement points on a single circle on the forming surface. For example, designating the direction of conveyance of the forming mold as the reference position, 0°, the positions of measurement points on a single circle can be specified as angles from the reference position within a range of 0° to 360°. Next, the angular rotation speed can be determined from each of the angles that have been specified. Based on research by the present inventors, the angular rotation speed at each position can be determined to satisfy Equation B below based on the temperature that is measured.

$$\omega \cdot (T-Tmin+1)/(Tmax-Tmin) = \text{const} \quad \text{Equation B}$$

(In Equation B: $\omega$ denotes the angular rotation speed, T denotes the temperature measured at a measurement point, Tmin denotes the minimum temperature among all measurement points, and Tmax denotes the maximum temperature among all measurement points.)

Based on Equation B, the larger T becomes, that is, the higher the temperature that is measured at the position, the lower the angular rotation speed. Thus, the angular rotation speed when the portion of maximum curvature is passing through the high temperature portion can in effect be made lower than the angular rotation speed when that portion is present in the low temperature portion, and the rotational speed when the high temperature direction and the maximum average curvature direction are approximately overlapped can be minimized by determining the angular rotation speed when the maximum average curvature direction overlaps various positions based on Equation B above in the course of causing the forming mold to undergo a single rotation. $\omega$ is desirably about 0.1047 to 6.282 rad/s (from one rotation per minute to one rotation per second), with about 0.01047 to 31.41 rad/s being also desirable. Once angular rotation speed $\omega$ has been determined, the angle $\theta$ for specifying the rotational position can be determined by taking the integral $\omega dt$ with respect to time T. It is thus possible to determine the angular rotation speed at each position during rotation of the forming mold. Additionally, when there is a sharp change in temperature, it is reflected in the angular speed, which increases sharply. In that case, when the magnitude of the acceleration is excessive, the glass material positioned on the forming mold will sometimes slip. To prevent such slippage, it is desirable to control the angular acceleration speed during rotation of the forming mold so that it remains at or below a certain value. Angular acceleration speed is proportional to the rate of change over time ($dT/d\theta$, also referred to as the temperature gradient) of the temperature at each angle (position on the forming mold). Thus, when $dT/d\theta$ or $d\omega/dT$ exceeds a prescribed value, it is possible to employ a small value for const in equation B and recalculate so that the angular acceleration speed does not exceed the prescribed value. The "prescribed value" corresponds to the coefficient of static friction of the glass material and a ceramic forming mold, for example, and can be experimentally obtained with the glass material positioned on the forming mold.

As set forth above, controlling rotation of the forming mold permits the glass material in the vicinity of the reference position for measuring the near dioptric power to receive a greater quantity of heat than other regions, facilitating deformation and resulting in deformation of the same degree as in other shape regions. As a result, the difference in time required to complete deformation in all regions of the glass material is decreased, and deformation is conducted in center-symmetric fashion. The generation of AS (astigmatisms) accompanying nonuniform deformation can be avoided. Since the deformation time of the reference position for measuring the near dioptric power, which had been rate controlling until now, can be reduced, it is possible to reduce the total deformation (processing) time and shorten the processing time.

[Controlling the Temperature in a Continuous Heating Furnace in the Second Aspect]

The details of the continuous heating furnace that can be employed and conveyance of the forming mold within the furnace are as set forth for the first aspect. In the same manner as in the first aspect, in the second aspect, it is desirable to control the temperature so that there is a temperature rising region containing a temperature distribution in which the temperature rises in the direction of conveyance of the forming mold through the continuous heating furnace. Within the temperature rising region, the glass material being formed can be heated so that the temperature permitting deformation of the glass material on the forming mold, desirably the temperature of the upper surface of the glass material being formed, reaches the glass transition temperature Tg-100° C. or higher of the glass constituting the glass material, desirably (Tg-50° C.) or higher, and more preferably, the glass transition temperature or higher. The temperature rising region can be a prescribed region beginning at the inlet of the continuous heating furnace. In the second aspect, it is desirable to provide a forming surface temperature distribution measurement position in at least the temperature rising region and to control rotation of the forming mold within this region.

In the second aspect, as in the first aspect, it is desirable to control the temperature so that a temperature rising region from the inlet side (forming mold introduction inlet), constant temperature maintenance region, and cooling region are contained within the continuous heating furnace.

In the second aspect, following measurement of the temperature distribution of the forming surface at the forming surface temperature distribution measurement position, the rotation conditions of the forming mold subsequent to that position are set in the manner set forth above. The above-described control of rotation of the forming mold is desirably conducted in at least the temperature rising region, and preferably also conducted in the constant temperature maintenance region and cooling region. That is, it is desirable to rotate and convey the forming mold within the furnace by suitably changing the rotation conditions of the forming mold based on the temperature distribution of the forming surface by conducting temperature measurement→specification of the high temperature portion→control of forming mold rotation, at any multiple spots within the furnace. More specifically, the second aspect is desirably conducted by means of steps S1 to S7 below:

(S1) Specifying a position (and a maximum average curvature direction) corresponding to a reference point for measurement of near portion on the forming mold;
(S2) Measuring the temperature on the forming surface of the forming mold;
(S3) Specifying a temperature distribution on the forming surface of the forming mold;
(S4) Specifying a high temperature portion, high temperature direction, and low temperature portion on the forming surface;
(S5) Calculating the angular speed from equation B and the temperature distribution;
(S6) Rotating the forming mold to minimize the angular speed during rotation when the direction (maximum average curvature direction) from the geometric center of the forming mold toward a position corresponding to a reference point for measurement of near portion overlaps the high temperature direction; and
(S7) Measuring the temperature distribution on the forming surface simultaneously with rotation or by rotation at some timing and repeating S2 to S6.

Specific embodiments of the manufacturing method of the present invention will be described next.

Temperature control in the continuous heating furnace is conducted in single cycles of prescribed duration.

An example of temperature control in which one cycle lasts 17 hours will be described below. However, the present invention is not limited to the embodiment described below.

Furnace temperature control can be conducted in seven steps. The first step (A) is a preheating step. The second step (B) is a rapid heating and temperature-rising step. The third step (C) is a slow heating and temperature-rising step. The fourth step (D) is a step in which a constant temperature is maintained. The fifth step (E) is a slow cooling step. The sixth step (F) is a rapid cooling step. And the seventh step (G) is a natural cooling step.

In the preheating step (A), which is the first step, a constant temperature close to room temperature is maintained for 90 minutes. This is done in order to establish a uniform temperature distribution throughout the glass material and to facilitate reproducibility of the thermal distribution of the glass material by temperature control during processing by heat-softening. The temperature that is maintained can be any temperature of about room temperature (about 20 to 30° C.).

In rapid heating step (B), which is the second step, heating is conducted for about 90 minutes by increasing the temperature from room temperature (for example, 25° C.) to a temperature 50° C. below (also called "T1" hereinafter) the glass transition temperature (also referred to as "Tg" hereinafter) at a rate of about 4° C./min, for example. Then, in slow heating step (C), which is the third step, heating is conducted for 120 minutes by increasing the temperature from temperature T1 to a temperature about 50° C. below the glass softening point (also called "T2" hereinafter) at a rate of 2° C./min, for example. In constant temperature maintenance step (D), which is the fourth step, temperature T2 is maintained for about 60 minutes.

The glass material that has been heated to temperature T2 is heated for 30 minutes in the constant temperature maintaining step. Heating is then conducted for another 30 minutes at temperature T2. When a forming mold having through-holes as described above is employed, during these latter 30 minutes, suction processing can be conducted through the through-holes in the forming mold. The suction processing can be conducted by operating a suction pump positioned outside the electric furnace. The negative pressure is generated by the suction with a suction pump, applying suction to the glass material positioned in the forming mold through the through-holes of the forming mold. The generation of a suction of 80 to 150 mmHg ($\approx 1.0 \times 10^4$ to $1.6 \times 10^4$ Pa) through a suction inlet of the prescribed heat-resistant base mold begins 30 minutes after the start of heating at temperature T2 in the electric furnace.

Once the suction has been completed, heat-softening deformation of the glass material onto the forming mold is concluded. Once deformation by heat-softening has been concluded, cooling is conducted. In slow cooling step (E), the fifth step, cooling is conducted, for example, for about 300 minutes at a rate of 1° C./min to a temperature 100° C. below Tg (also called "T3" hereinafter) to fix the change in shape caused by deformation. The slow cooling step also comprises annealing elements to remove glass distortion.

Next, in rapid cooling step (F), the sixth step, cooling is conducted to about 200° C. at a rate of about 1.5° C./min. There is a risk of the glass that has been processed by softening and the forming mold being damaged by their own thermal contraction and differences between each other in coefficients of thermal expansion to temperature change. Accordingly, the temperature change rate is preferably small to the extent that damage does not occur.

Further, when the temperature drops to equal to or lower than 200° C., natural cooling step (G), the seventh step, is conducted. In natural cooling step (G), natural cooling is conducted from 200° C. to room temperature.

Once softening processing has been completed, the lower surface of the glass material and the forming surface of the mold fit precisely together. The upper surface of the glass material deforms based on the shape deformation of the lower surface of the glass material, forming the desired optical surface. Once the glass optical surface has been formed in the above steps, the glass material is removed from the forming mold, yielding a formed article. The formed article thus obtained can be employed as a casting mold for eyeglass lenses, preferably as a casting mold for progressive dioptric power lenses, both surfaces of which are aspherical. Alternatively, a portion such as the rim portion can be removed and then the formed article can be employed as a casting mold for such eyeglass lenses.

The present invention further relates to a method of manufacturing an eyeglass lens comprising manufacturing a lens casting mold by the above-described method and manufacturing an eyeglass lens by cast polymerization with the lens casting mold that has been manufactured or some part thereof as the casting mold. It is possible to control deformation due to heat softening, and thus to manufacture a lens casting mold with few errors relative to design values and in which the symmetry of the error level is maintained by rotating the forming mold so that the portion of considerable curvature remains for an extended period in the high temperature portion based on the curvature distribution and temperature distribution on the forming surface of the forming mold by the method of manufacturing a lens casting mold of the present invention set forth above. By using this lens casting mold, it is possible to obtain eyeglass lenses affording good wear sensation, and more specifically, progressive dioptric power lenses. The above cast polymerization can be conducted by known methods.

Reference Aspect

The present invention set forth above utilizes the temperature distribution in a continuous heating furnace to control the amount of deformation of glass. Based on the same thinking, the present inventors discovered an aspect (reference aspect) suited to the manufacturing of casting molds for astigmatic dioptric power lenses and casting molds for progressive dioptric power lenses both surfaces of which are aspherical.

The reference aspect will be described below.

Astigmatic dioptric power lenses and progressive dioptric power lenses both surfaces of which are aspherical have two points where the curvature is approximately maximum within the surface on the optical surface (referred to as "maximum curvature points", hereinafter) at positions, between which the geometric center is positioned, on a single axis passing through the geometric center. The molding surface of mold for forming such optical surfaces also has two maximum curvature points on an axis corresponding to the above axis. Further, the forming surface of the forming mold for forming the molding surface of the mold by the hot sag forming method also has two maximum curvature points on an axis corresponding to the above axis in the same manner as the molding surface of the mold. That is, an axis on which two points of approximately maximum curvature between which the geometric center is positioned is present in the forming surface of a forming mold.

Additionally, the temperature is normally controlled in a continuous heating furnace so that the high temperature is on the conveyance direction side and the low temperature is in the opposite direction (or vice versa). For example, in a region in a furnace in which the temperature is controlled so that the high temperature is on the conveyance direction side and the low temperature lies in the opposite direction, when an axis on which the geometric center is positioned between two maximum curvature points overlap the conveyance direction and the forming mold is conveyed, one of the maximum curvature points will be disposed on the high temperature side and the other point on the low temperature side. In this state, a major discrepancy in the timing at which the lower surface of the glass material on the same axis tightly contacts with the forming surface of the forming mold results in astigmatisms that are not necessary for eyeglass correction in an eyeglass lens molded with the mold obtained.

Accordingly, the present inventors conducted extensive research resulting in the discovery that by determining the state of conveyance of the forming mold based on the positional relation between the above axis and the high temperature portion on the forming surface of the forming mold in a continuous heating furnace, it was possible to reduce the discrepancy in the timing of tight contact of the lower surface of the glass material and the forming surface of the forming mold on the same axis. This was because it was possible to eliminate the nonuniformity in the temperature distribution where one of the maximum curvature points lying on the same axis was disposed on the high temperature side and the other was disposed on the low temperature side, permitting portions that needed to be similarly deformed on the same axis to be uniformly heated.

The present inventors conducted extensive research based on this discovery, and devised the reference aspect.

The reference aspect relates to a method of manufacturing a lens casting mold by introducing a forming mold, with a forming surface on which a glass material being formed is positioned, into a continuous heating furnace and conducting thermal treatment while conveying the forming mold in the furnace to form an upper surface of the glass material being formed by bring a lower surface of the glass material being formed into tight contact with the forming surface, which comprises:

utilizing, as the forming mold, a forming mold having a curvature distribution on the forming surface and having two points of approximately maximum curvature on the forming surface at positions on a single virtual axis running through a geometric center, the geometric center being positioned between the positions; and in one or two or more regions in the furnace, specifying a forming mold conveyance direction as a reference direction, or directly or indirectly measuring a temperature at two or more measurement points on the forming surface of the forming mold and specifying the direction running from the geometric center of the forming surface toward a point that is of maximum temperature among the two or more measurement points as a reference direction;

optionally comprising continuously or intermittently repeating rotation of the forming mold in a horizontal direction during conveyance through the furnace; and determining the positioning of the forming mold during conveyance and/or determining the angular rotation speed of the rotation based on the angle formed between the reference direction and the virtual axis in the region in which a reference direction has been specified.

The forming mold may be conveyed with the reference direction and the virtual axis in an approximately perpendicular state in the region in which the reference direction has been specified.

The forming mold may be conveyed while being rotated in the region in which the reference direction has been specified so that the angular rotation speed when the direction perpendicular to the reference direction overlaps the virtual axis is the minimum speed during a single rotation.

The above method may comprise specifying the average curvature in a direction running from the geometric center of the forming surface of the forming mold toward the perimeter portion in two or more different directions prior to introduction into the furnace. In that case, the angular rotation speed may be determined so as to satisfy Equation C below:

$$\omega \cdot AC_n = k \quad \text{Equation C}$$

(In Equation C, co denotes the angular rotation speed of the forming mold as the $n^{th}$ direction (where n denotes an integer specifying each direction among the directions of which average curvatures have been specified without overlapping of the number n) passes through the direction perpendicular to the reference direction; $AC_n$ denotes the average curvature in the $n^{th}$ direction; and k denotes an approximate constant.)

The lens casting mold may be a casting mold for an astigmatic dioptric power lens having a plus dioptric power. In that case, the virtual axis may be located in a position corresponding to the second major meridian of the astigmatic dioptric power lens on the forming surface.

The lens casting mold may be a casting mold for an astigmatic dioptric power lens having a minus dioptric power. In that case, the virtual axis may be located in a position corresponding to the first major meridian of the astigmatic dioptric power lens on the forming surface.

The lens casting mold may be a casting mold for a progressive dioptric power lens both surfaces of which are aspherical.

Furthermore, a lens casting mold may be manufactured by the reference aspect and the lens casting mold that has been manufactured, or a portion thereof, may be employed as a casting mold to manufacture an eyeglass lens by cast polymerization. The lens that is manufactured can be an astigmatic dioptric power lens or a progressive dioptric power lens both surfaces of which are aspherical.

The reference aspect will be described in greater detail below.

The casting mold that is manufactured based on the reference aspect is desirably a casting mold for an astigmatic dioptric power lens or a progressive dioptric power lens both surfaces of which are aspherical. Examples of the shape characteristics of the optical surfaces of these two types of lenses are: (1) the curvature is not constant within the surface, with different curvatures being present at some two points in at least a portion of the surface (there is a curvature distribution within the surface); and (2) there are two points at which the curvature within the surface peaks (maximum curvature points) lying on a single axis running through the geometric center at positions between which the geometric center is positioned (specifically, symmetric positions with the geometric center as boundary). The molding surface of a casting mold for forming such an optical surface by cast polymerization (surface disposed within the cavity of the mold during cast polymerization) also has shape characteristics (1) and (2). The forming surface of a forming mold for hot sag forming method for manufacturing the above casting mold also has shape characteristics (1) and (2). That is, the forming mold for the casting mold for manufacturing an astigmatic dioptric power lens or a progressive dioptric power lens both surfaces of which are aspherical has a curvature distribution on the forming surface thereof and has two points (maximum curvature points) at which the curvature approximately peaks on the forming surface at positions between which the geometric center is positioned on a single axis (virtual axis) running through the geometric center. The "approximately" employed in this context includes differences of about ±15 percent or about ±1 base curve degree.

In the hot sag forming method, the upper surface of a glass material being formed is shaped by causing the lower surface of the glass material being formed to tightly contact with the forming surface of the forming mold. However, as set forth above, when there is a considerable discrepancy in the timing of tight contact with the forming surface of the lower surface of the glass material being formed, astigmatisms that are not necessary for eyeglass correction are produced in an eyeglass lens molded by the casting mold obtained. Since two maximum curvature points (points where the curve is deepest) are present on a single axis as set forth above in the forming mold employed in the reference aspect, the timing of tight contact with the lower surface of the glass material being formed should be synchronized at these two points for effective suppression of the generation of these astigmatisms.

Additionally, since numerous items to be processed can be continuously processed in a continuous electric furnace, productivity is effectively enhanced by the continuous electric furnace. However, a temperature gradient is necessarily generated within the furnace. In other words, there is no continuous electric furnace with uniform temperature distribution. Accordingly, the temperature distribution on the items being processed will necessarily be nonuniform. As a countermeasure to the nonuniform temperature distribution within a continuous heating furnace, Japanese Unexamined Patent Publication (KOKAI) Showa No. 63-306390 proposes attempting to achieve uniform heating by rotating the item being heated. By contrast, in the reference aspect, it is possible to effectively inhibit the generation of the astigmatisms caused by nonuniform heating of the two maximum curvature points by rendering uniform the quantities of heat applied to two maximum curvature points on a single axis that should be uniformly heated by the heat-softening forming method employing a forming mold having above-described shape characteristics (1) and (2) and utilizing the temperature distribution within the furnace.

[Specifying the Reference Direction]

A continuous heating furnace is also employed to form a glass material being formed in order to enhance productivity in the reference aspect in the same manner as in the present invention. In the continuous heating furnace, for example, the temperature of the atmosphere within the furnace is controlled so that the temperature increases in the direction of conveyance of the forming mold. In this case, the temperature distribution on the forming surface of the forming mold passing through the furnace tends to be such that the high temperature is on the direction of conveyance side and the low temperature lies in the reverse direction. Accordingly, when the forming mold is conveyed in a state in which the axis on which the two maximum curvature points lie overlaps the direction of conveyance, one of the two maximum curvature points that require the application of uniform quantities of heat to induce equal deformation is exposed to a low temperature while the other is exposed to a high temperature, and the timing at which the two maximum curvature points tightly contact with the lower surface of the glass material is far from synchronous. In contrast to the above embodiment, when the forming mold is conveyed in a state where the axis containing the two maximum curvature points overlaps the conveyance direction in a continuous heating furnace in which the atmospheric temperature is controlled to lower the temperature in the direction of conveyance of the forming mold, one of the two maximum curvature points is exposed to a high temperature and the other is simultaneously exposed to a low temperature in the same manner as above.

Accordingly, in an implementation mode of the reference aspect, by adopting the conveyance direction as a reference direction, the forming mold is positioned during conveyance through the furnace and the angular rotation speed of optionally conducted rotation is determined, as set forth further below, thereby making it possible to apply uniform quantities of heat to the two maximum curvature points on a single axis. Thus, a major discrepancy in timing can be avoided in the tight contact with the lower surface of the glass material by the two maximum curvature points.

However, due to the effects of thermal conductivity and the like of the material constituting the forming mold, the temperature distribution of the atmospheric temperature in the continuous heating furnace normally does not completely overlap the temperature distribution on the forming surface of the forming mold passing through the furnace. For example, in the temperature distribution on the forming surface of the forming mold passing through the furnace, the maximum temperature sometimes does not lie in the conveyance direction, even when the atmospheric temperature in the furnace is controlled so that the temperature increases in the direction of conveyance of the forming mold. Taking this into account in another implementation mode of the reference aspect, the temperature at two or more measurement points on the forming surface of the forming mold is directly or indirectly measured in one or two or more regions in the continuous heating furnace. In these regions, among two or more different directions running from the geometric center toward the perimeter portion on the forming surface of the forming mold, the direction that is being heated to the highest temperature is specified, the specified direction (maximum temperature direction) is employed as a reference direction, and as set forth further below, the forming mold is positioned during conveyance through the furnace and the angular rotation speed of the optionally conducted rotation is determined. This also can avoid a major discrepancy in timing in the tight contact with the lower surface of the glass material by the two maximum curvature points.

Both of the above implementation modes can avoid the application of a larger amount of heat to one of the two maximum curvature points than to the other, thereby reducing the discrepancy in the timing at which the two maximum curvature points on a single axis tightly contact with the lower surface of the glass material. Of the two, the latter implementation mode conducts positioning and determines the angular rotation speed based on the temperature distribution on the forming surface of the forming mold, and is thus advantageous in that it more effectively reduces the discrepancy in timing.

In the latter implementation mode, measurement of the temperature distribution on the forming surface of the forming mold can be conducted in the same manner as in the first aspect. The direction running from the geometric center toward the maximum temperature point on the virtual line passing through the maximum temperature point (the direction of the hollow white arrow in FIG. 3) can be specified as the maximum temperature direction based on the results of measurement of the temperature distribution.

[Conveying the Forming Mold in the Reference Aspect]

Since a temperature gradient is present in the continuous heating furnace as set forth above, the opposite direction (the direction of the hatched arrow in FIG. 3) from the maximum temperature direction specified by the above-described method normally becomes the minimum temperature direction. Accordingly, when a forming mold is conveyed within a continuous heating furnace in a state in which a virtual line passing through the maximum temperature point and the geometric center overlaps a virtual line having two maximum curvature points at positions between which the geometric center is positioned, one of the two maximum curvature points will be heated to the maximum temperature within the surface and the other will be heated to the minimum temperature. The maximum curvature point that is heated to the maximum temperature will tightly contacts with the lower surface of the glass material more rapidly than the other maximum curvature point, thereby producing variation in the timing at which the two maximum curvature points tightly contact with the lower surface of the glass material. Further, variation will similarly result in the course of conveying the forming mold in a state in which the conveyance direction overlaps the above virtual axis, as set forth above. Accordingly, in the reference aspect, either the forming mold conveyance direction or a maximum temperature direction that has been determined by the above-described method is specified as the reference direction and the position of the forming mold during conveyance through the furnace is controlled, desirably so that the virtual axis and the reference direction do not overlap, or so that the period during which they overlap is brief, based on the angle formed by the reference direction and the above virtual axis to reduce the variation in the timing at which the two maximum curvature points tightly contact with the lower surface of the glass material. The following methods A and B are a desirable embodiment for position control.

Method A (Positioning the Forming Mold)

Figure 24:
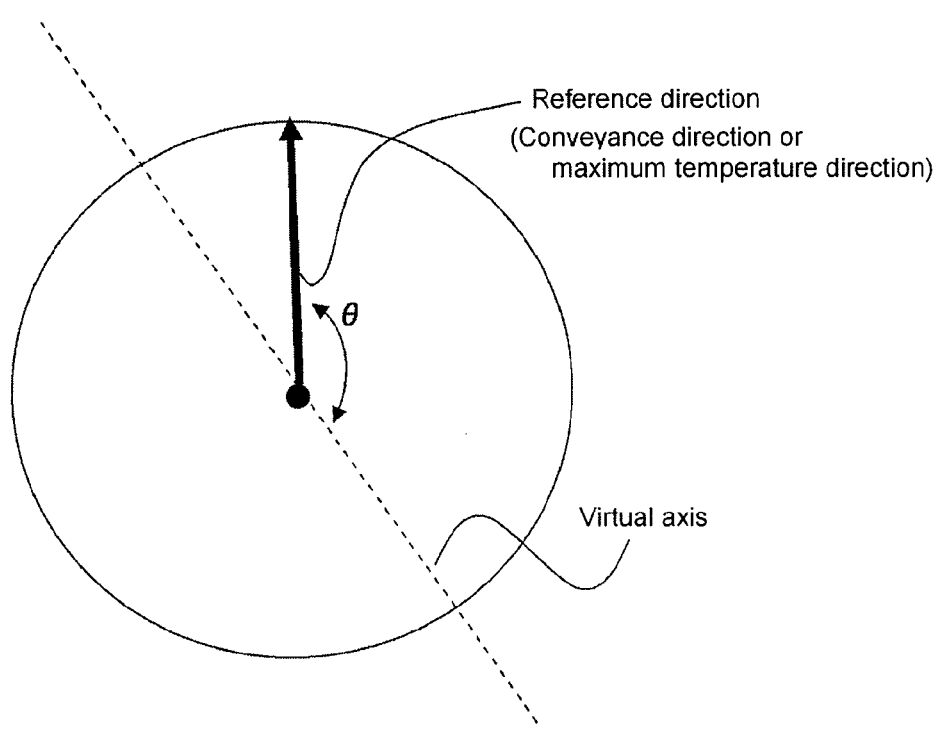
FIG. 24 is a descriptive drawing of the angle formed by the maximum temperature direction and a virtual axis on the forming surface in a reference embodiment.

In the reference aspect, the forming mold can be optionally rotated within the continuous heating furnace. When not rotating the forming mold within the furnace or when just rotating it in some region, it is desirable to convey the forming mold in a positioned state so that the virtual axis containing the two maximum curvature points does not overlap the reference direction (so that the angle formed by the reference direction and the virtual axis does not become 0°) in the region for which a reference direction has been specified by the above method. The angle that is formed by the reference direction and the virtual axis refers to angle θ shown in FIG. 24 and is determined within a range of equal to or greater than 0° but less than 180°, desirably from 45 to 135°, preferably from 85 to 95°, and more preferably, approximately 90°, that is, so that the reference direction and virtual axis are approximately perpendicular.

Setting the angle of approximately 90° is particularly desirable when manufacturing an astigmatic dioptric power lens casting mold. The reasons for this are as follows.

An astigmatic dioptric power lens has two points where the curvature reaches approximate minima within the surface ("minimum curvature points" hereinafter) at symmetric positions having as their boundary a geometric center on an axis perpendicular to the axis containing the two maximum curvature points. Since the minimum curvature points are the points where the curve is the smallest within the surface, the amount of heating deformation causing the lower surface of the glass material to tightly contact with the minimum curvature points is normally the smallest within the surface. As set forth above, the maximum temperature direction and minimum temperature direction are normally contained on virtual lines passing through the maximum temperature points and the geometric center, so heating on these virtual lines tends to be nonuniform. The conveyance direction side of the virtual line containing the forming mold conveyance direction is normally of high temperature, and the opposite direction side is normally of low temperature (or vice versa), so heating similarly tends to be nonuniform. When such nonuniform heating is conducted on the axis containing the two maximum curvature points, it produces the above astigmatism. However, since the minimum curvature points are normally the portions in the surface that undergo the least amount of deformation, even were there to be a discrepancy in the timing at which the two minimum curvature points tightly contacted with the lower surface of the glass material, the effect on the astigmatism would be extremely small and of practically negligible degree. Accordingly, when manufacturing an astigmatic dioptric power lens casting mold, the angle formed by the reference direction and the virtual axis containing the two maximum curvature points is desirably made approximately 90° so that the axis on which the two minimum curvature points are present overlaps the reference direction (conveyance direction or maximum temperature direction).

There are astigmatic dioptric power lenses of plus dioptric power and minus dioptric power. In a forming mold for manufacturing a casting mold for astigmatic dioptric power lenses of plus dioptric power, the virtual axis can be specified at a position corresponding to the second major meridian of the astigmatic dioptric power lens on the forming surface of the forming mold. Conversely, in a forming mold for manufacturing a casting mold for astigmatic dioptric power lenses of minus dioptric power, the virtual axis can be specified at a position corresponding to the first major meridian of the astigmatic dioptric power lens on the forming surface of the forming mold. The term "plus dioptric power" means that the transmission dioptric power is a positive value, and the term "minus dioptric power" means that the transmission dioptric power is a negative value. In the relation between the lens and the forming mold in the present invention, the term "corresponding position" means the position that tightly contacts with the lower surface of the glass material and that is opposite the portion on the lower surface of the glass material that becomes the portion that is transferred to the lens by the outer surface of the casting mold that is obtained.

Method B (Controlling Rotation of the Forming Mold)

Method A is a method that makes it possible to achieve a uniform level of deformation in two maximum curvature points by positioning the forming mold during conveyance through the furnace. Method B is a method that makes it possible to control the level of deformation at two maximum curvature points on the forming surface and further, to control the level of deformation in the surface as a whole by continuously or intermittently repeating the rotation of the forming mold inn a horizontal direction in at least some region within the furnace. The rotation of the forming mold is desirable conducted about the geometric center of the forming mold as axis. Rotation of the forming mold can be conducted in just one direction, or the reverse direction can be suitably combined. For example, after conducting approximately full circle rotation in a given direction (the positive direction), approximately full circle rotation can be conducted in the opposite direction, and the cycle repeated.

In the embodiment in which the maximum temperature direction is employed as a reference direction, the minimum temperature direction is present in the opposite direction from the maximum temperature direction. Therefore, when one of the two maximum curvature points is made to remain for an extended period in the maximum temperature direction, the other maximum curvature point is necessarily made to remain for an extended period in the minimum temperature direction, resulting in pronounced variation in the level of deformation at the two maximum curvature points. The same phenomenon occurs in the embodiment in which the conveyance direction is made the reference direction. Accordingly, the forming mold is desirably rotated in the region in which the reference direction is specified during a single rotation so that the angular rotation speed is minimized when the direction perpendicular to the reference direction and the virtual axis overlap, in order to shorten the nonuniform state of heating during which one of the maximum curvature points is on the high temperature side and the other maximum curvature point is on the low temperature side, resulting in a nonuniform state of heating. It is also possible to temporarily stop the rotation (employ an angular rotation speed of zero) with the direction perpendicular to the reference direction in a state of overlapping with the virtual axis, and once a prescribed period has elapsed, begin rotation anew from the state in which the direction perpendicular to the reference direction overlaps the virtual axis. Causing the two maximum curvature points to remain for an extended period at positions that are maximally removed from the reference position in this manner can effectively shorten the nonuniform state of heating during which one of the maximum curvature points is on the high temperature side and the other maximum curvature point is on the lower temperature side. With regard to rotation in the reference aspect, the term "single rotation" means each of approximately full circle rotation for embodiments in which more than one complete rotation is conducted per direction.

It is desirable to employ a method of determining the angular rotation speed during the rotation in a manner satisfying Equation C below after specifying the average curvature in two or more different directions running from the geometric center of the forming surface of the forming mold toward the perimeter portion prior to introduction into the furnace, as a method of controlling the angular rotation speed as set forth above.

$$\omega \cdot AC_n = k \quad \text{Equation C}$$

(In Equation C, $\omega$ denotes the angular rotation speed of the forming mold as the $n^{th}$ direction (n denoting an integer specifying each direction among the directions of which average curvatures have been specified without overlapping of the number n) passes through the direction perpendicular to the reference direction; $AC_n$ denotes the average curvature in the $n^{th}$ direction; and k denotes an approximate constant.)

Based on Equation C, the greater the average curvature in the direction perpendicular to the reference direction, that is, on the axis passing through the position farthest removed from the reference direction, the lower the angular rotation speed becomes. Since the average curvature on the forming surface of the forming mold normally peaks in the direction containing the maximum curvature points, Equation C makes it possible for the direction containing the maximum curvature points to remain for an extended period at the position farthest removed from the reference position, effectively shortening the period during which one of the maximum curvature points is on the high temperature side and the other maximum curvature point is on the low temperature side.

Based on Equation C, the greater the average curvature in the $n^{th}$ direction passing through the direction perpendicular to the reference direction, the lower the angular rotation speed of the forming mold. In this context, n denotes an integer specifying each direction among the directions of which average curvatures have been specified without overlapping of the number n. For example, take the case where average curvatures are specified in three directions. The directions in which average curvatures have been designated are specified as the first direction (n=1), second direction (n=2), and third direction (n=3). Controlling the angular rotation speed based on the average curvature in the direction perpendicular to the reference direction in this manner can shorten the period during which the two maximum curvature points remain in the reference direction, that is, the period during which one of the maximum curvature points is on the high temperature side and the other maximum curvature point is on the low temperature side in a nonuniform heating state, making it possible to match the timing at which the two maximum curvature points tightly contact with the lower surface of the glass material due to heat softening of the glass material. In Method B, rotation of the forming mold is continuously or intermittently repeated. That is, rotation is conducted multiple times. These multiple rotations may all be conducted under identical rotation conditions, or under differing rotation conditions. In both embodiments, the angular rotation speed can be controlled during each rotation as set forth above.

$\omega$ is desirably about 0.1047 to 6.282 rad/s (from one rotation per minute to one rotation per second), and is also desirably about 0.01047 to 31.41 rad/s. The k in equation C is an approximate constant that can be set as desired. It is desirably set based on the maximum and minimum values of the average curvature on the forming surface so that w falls within the above desirable range of w. The approximate constant refers to a constant that varies by +10 percent. When the angular rotation speed becomes excessively high, the glass material that is placed on the forming surface will sometimes slip, depending on the coefficient of friction of the forming surface and the lower surface of the glass material. In such cases, it is desirable to set approximate constant k so that w becomes relatively low within the above desirable range. Although also depending on the shape of the forming surface of the forming mold (the maximum and minimum values of the average curvature) and the coefficient of friction of the forming surface and the lower surface of the glass material, approximate constant k can be set to within a range of 0.01 to 314.1, for example.

The method of specifying the average curvature on the forming surface of the forming mold will be described next.

A forming mold having a curvature distribution on the forming surface thereof is employed in the present invention. Accordingly, among two or more directions running from the geometric center of the forming surface toward the perimeter portion, the average curvature will not be everywhere identical, and there will be two or more directions in which the average curvature differs. For example, in a forming mold for manufacturing a casting mold for progressive dioptric power lenses both surfaces of which are aspherical, three or more directions in which the average curvature differs are present on the forming surface. A "progressive dioptric power lens both surfaces of which are aspherical" is provided with progressive dioptric power effects that are divided between a first dioptric surface on the surface on the object side and a second dioptric surface on the surface on the eyeball side, and imparts a far viewing-use dioptric power (Df) and an added dioptric power (ADD) based on a prescription by the combination of the first dioptric surface and the second dioptric surface. In a progressive dioptric power lens both surfaces of which are aspherical, the first dioptric surface is either left-right symmetrical about a boundary in the form of a single meridian passing through the reference point for measurement of far portion (far viewing-use diopter power measurement reference position), or a rotated surface having a bus line in the form of a meridian passing through the reference point for measurement of far portion. In contrast, the second dioptric surface corresponds to the convergence effects of the eyes in near vision, such that the reference point for measurement of near portion (near viewing-use diopter power measurement reference position) is offset inside toward the nose by a prescribed distance. The optical surface of a lens molded with the lens casting mold obtained based on the present invention may be either the first dioptric surface or second dioptric surface, with the first dioptric surface being desirable. Details regarding progressive dioptric power lenses both surfaces of which are aspherical may be had by referencing, for example, Japanese Unexamined Patent Publication (KOKAI) Nos. 2003-344813 and 2008-116510. The contents of these publications are expressly incorporated herein by reference in their entirety.

Methods 1 and 2 above are examples of methods of specifying the average curvature in various directions when the average curvature differs in multiple directions within the surface, as in the above-described progressive dioptric power lens both surfaces of which are aspherical. The forming mold used to manufacture the casting mold for the above-described progressive dioptric power lens both surfaces of which are aspherical has a complex surface shape, but the average curvature in various directions can be readily specified by Method 1. In Method 2, the average curvature in various directions running from the geometric center of the forming surface toward the perimeter portion can be specified based on the prescription values of the eyeglass lens, such as the axis of astigmatism, reference point for measurement of near portion, and reference point for measurement of far portion.

[Controlling the Temperature in the Reference Aspect in a Continuous Heating Furnace]

The details of continuous heating furnaces that can be used and conveyance of the forming mold through the furnace in the reference aspect are identical to those set forth in the first aspect. In the reference aspect, as in the first aspect, the temperature is desirably controlled so that a temperature rising region having a temperature distribution in which the temperature rises in the direction of conveyance of the forming mold through a continuous heating furnace will be present. In the temperature rising region, the glass material being formed can be heated to a temperature at which the glass material on the forming mold is capable of deforming, desirably to a temperature at which the upper surface temperature of the glass material being formed reaches the glass transition temperature Tg-100° C. or greater of the glass constituting the glass material, preferably (Tg-50° C.) or greater, and more preferably, the glass transition temperature or greater. The temperature rising region can be a prescribed region beginning at the inlet of the continuous heating furnace. In the reference aspect, at least the temperature rising region can be made a temperature distribution measurement region within which the conveyance direction or the angular rotation speed is desirably controlled. This is because this is the region where softening and deformation on the forming mold progress the most. The conveyance direction or the angular rotation speed of the forming mold is preferably also controlled following the temperature rising region in the constant temperature maintenance region and cooling region. When rotation is controlled in multiple regions, approximate constant k in Equation C above can be changed for each region to set the angular rotation speed based on the heating temperature in each region. For example, in response to the average temperature in each zone, k can be changed (set low) to change (lower) the average value of the angular rotation speed. In zones at or below a certain temperature, k is suitably set to 0, at which no rotation occurs, to stop rotation.

The temperature is desirably controlled in a continuous heating furnace in the reference aspect as in the first aspect so as to incorporate, from the inlet (forming mold introduction inlet) side, a temperature rising region, constant temperature maintenance region, and cooling region.

The remaining details regarding the reference aspect are identical to the present invention. The formed article that is obtained based on the reference aspect can be employed as an eyeglass lens casting mold, desirably an astigmatic dioptric power lens casting mold or a lens casting mold for a progressive dioptric power both surfaces of which are aspherical. Alternatively, a portion thereof, such as the perimeter portion, can be removed and the remaining portion can be employed as the above-described eyeglass lens casting mold. Cast polymerization employing the casting mold obtained permits the manufacturing of eyeglass lenses affording good wear sensation.

EXAMPLES

The present invention will be described below based on Examples. However, the present invention is not limited to the embodiments shown in Examples.

1. Determining the Temperature Distribution within a Continuous Heating Furnace

The temperature distribution of a forming mold in a continuous heating furnace was measured under the following conditions.

Figure 13:
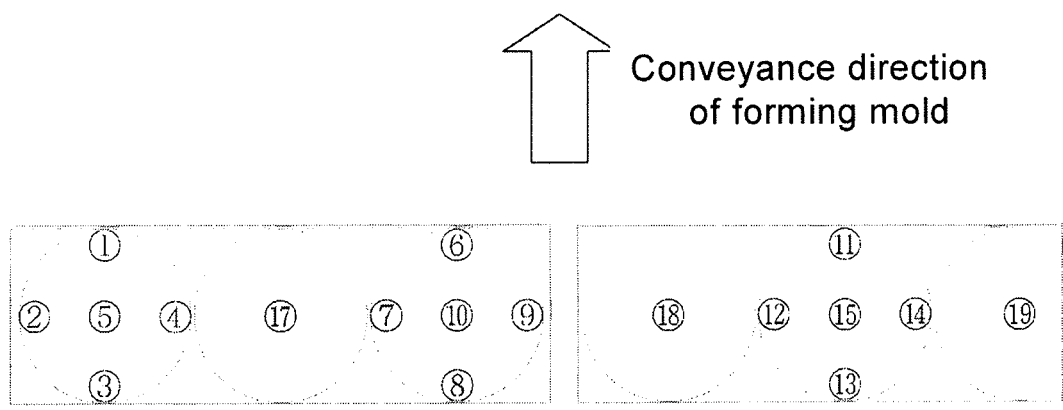
FIG. 13 shows the layout of sensors used to determine the temperature distribution in a continuous heating furnace.

An electric furnace was employed that had 2 horizontal rows and 54 vertical takts on its interior, permitting the positioning of three ceramic molds and preforms (glass material) each on plates of heat-resistant stainless steel in each of the two horizontal rows. The temperature distribution was measured in the four directions of the perimeter portion and (as a reference value) in the geometric center on each ceramic mold. Measurement was conducted with 19 sensors, which was thought to be the largest number of sensors that could be used without compromising the conveyor system. FIG. 13 shows the sensor layout in the horizontal direction. The temperature measurement positions were in the center and in the perimeter portion of the forming mold along the outer periphery. The smallest number was positioned to the outlet side of the electric furnace at the time of introduction into the electric furnace. In FIG. 13, sensor number 16, not shown, was used to measure the room temperature.

Figure 14:
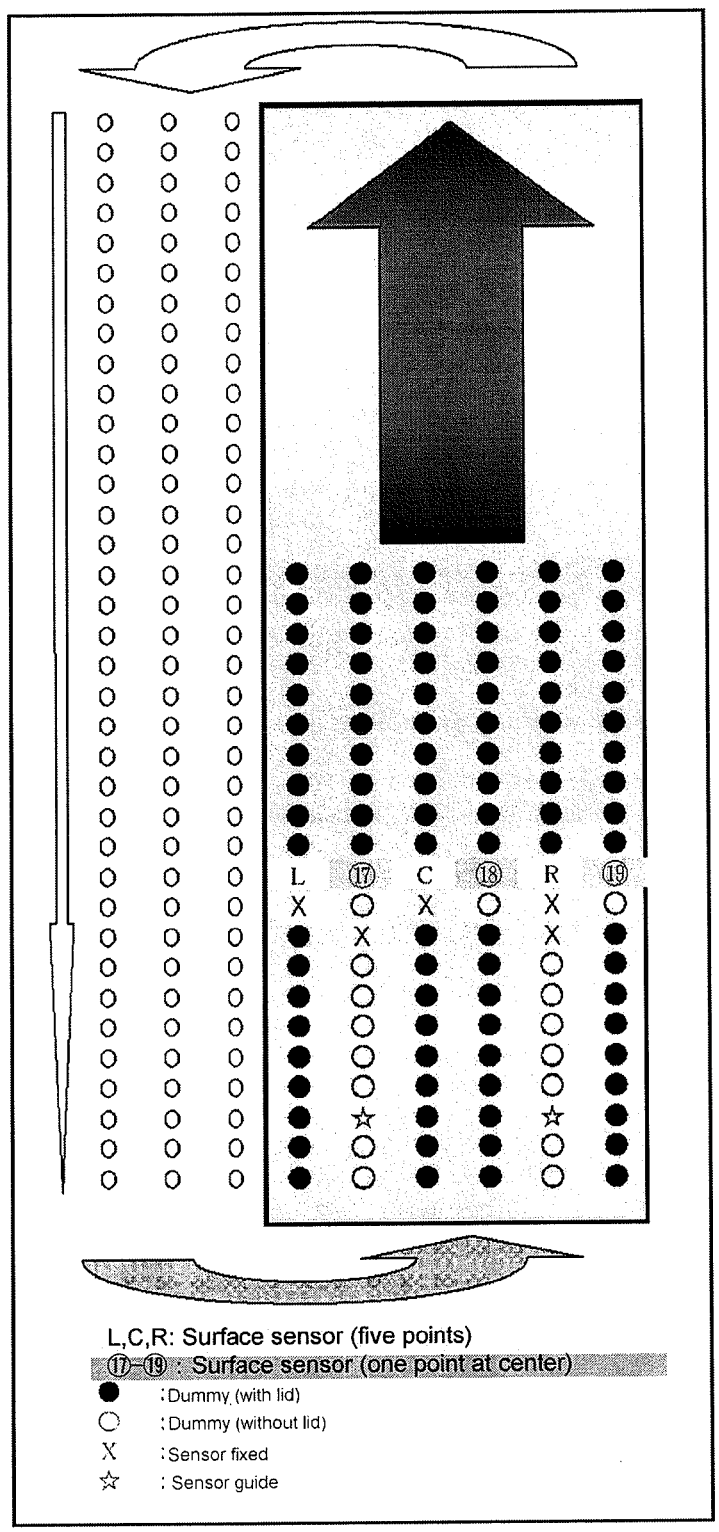
FIG. 14 shows the layout in an electric furnace during the measurement of the temperature distribution in a continuous heating furnace.

An electric furnace equipped in this fashion with sensors was employed during normal mass production charging. Dummy ceramic molds were positioned in front of and behind the sensors. The interior of the furnace was controlled to achieve the temperature distribution described in the specific embodiment above, and the electric furnace was operated. FIG. 14 shows the layout within the electric furnace.

Figure 15:
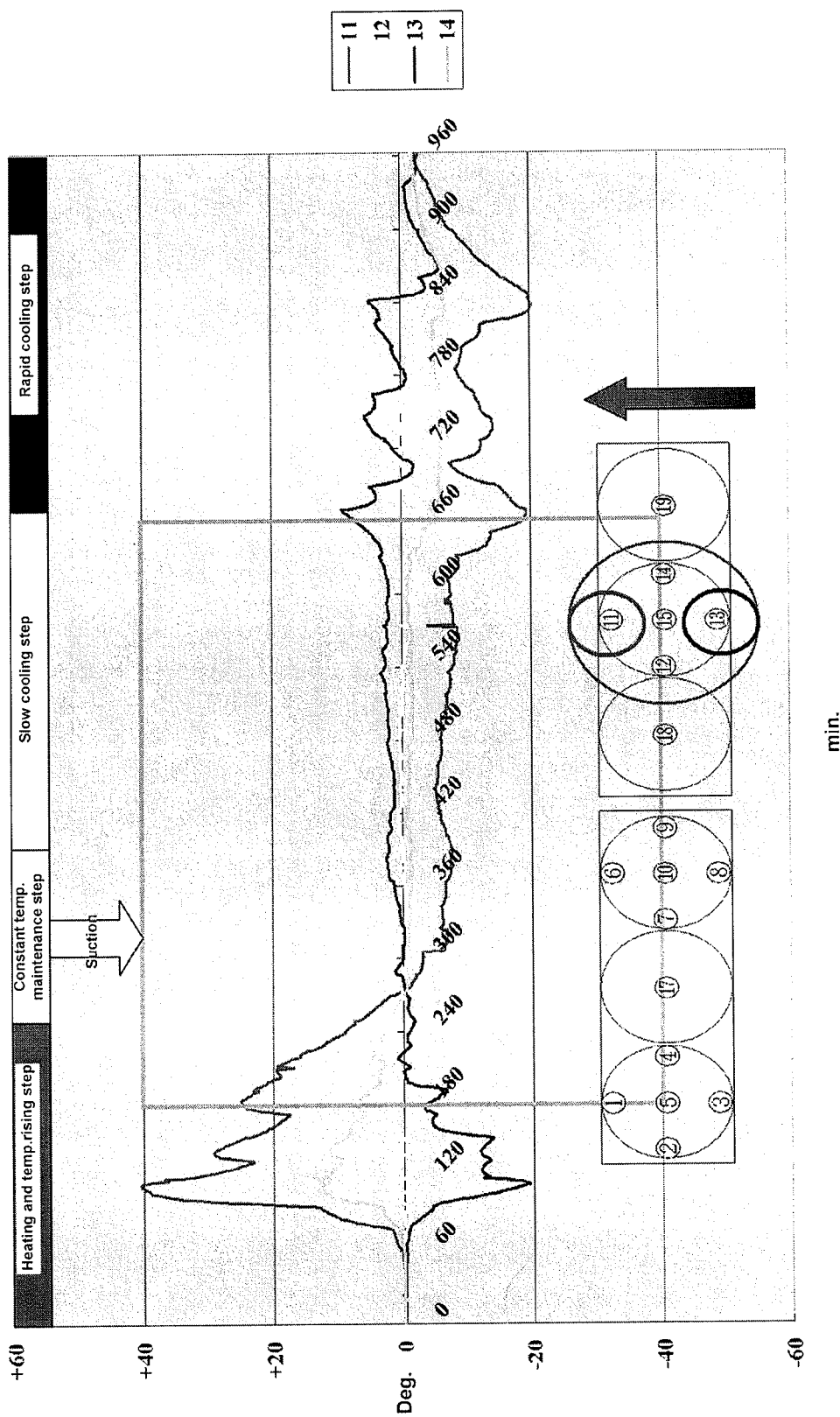
FIG. 15 shows the results of measurement (measurement (center portion) deviation results) of the temperature distribution in a continuous heating furnace.

FIG. 15 shows the results of temperature deviation measurement (center portion) by sensor nos. 11, 12, 13, and 14. As shown in FIG. 15, the temperature at the center of each of the six horizontal forming molds was kept to ±5° C. in the range of equal to or higher than 600° C. In the range of temperature increase from the glass transition temperature Tg (485° C.) to the maximum temperature, a difference of about ±15° C. was observed. For example, along the axis of the direction of advance within the electric furnace (conveyance direction of the forming mold), the side on the direction of advance was 15° C. higher from Tg to the maximum temperature. In the vicinity of the maximum temperature, the side of the direction of advance was observed to be 5° C. lower on average.

Figure 16:
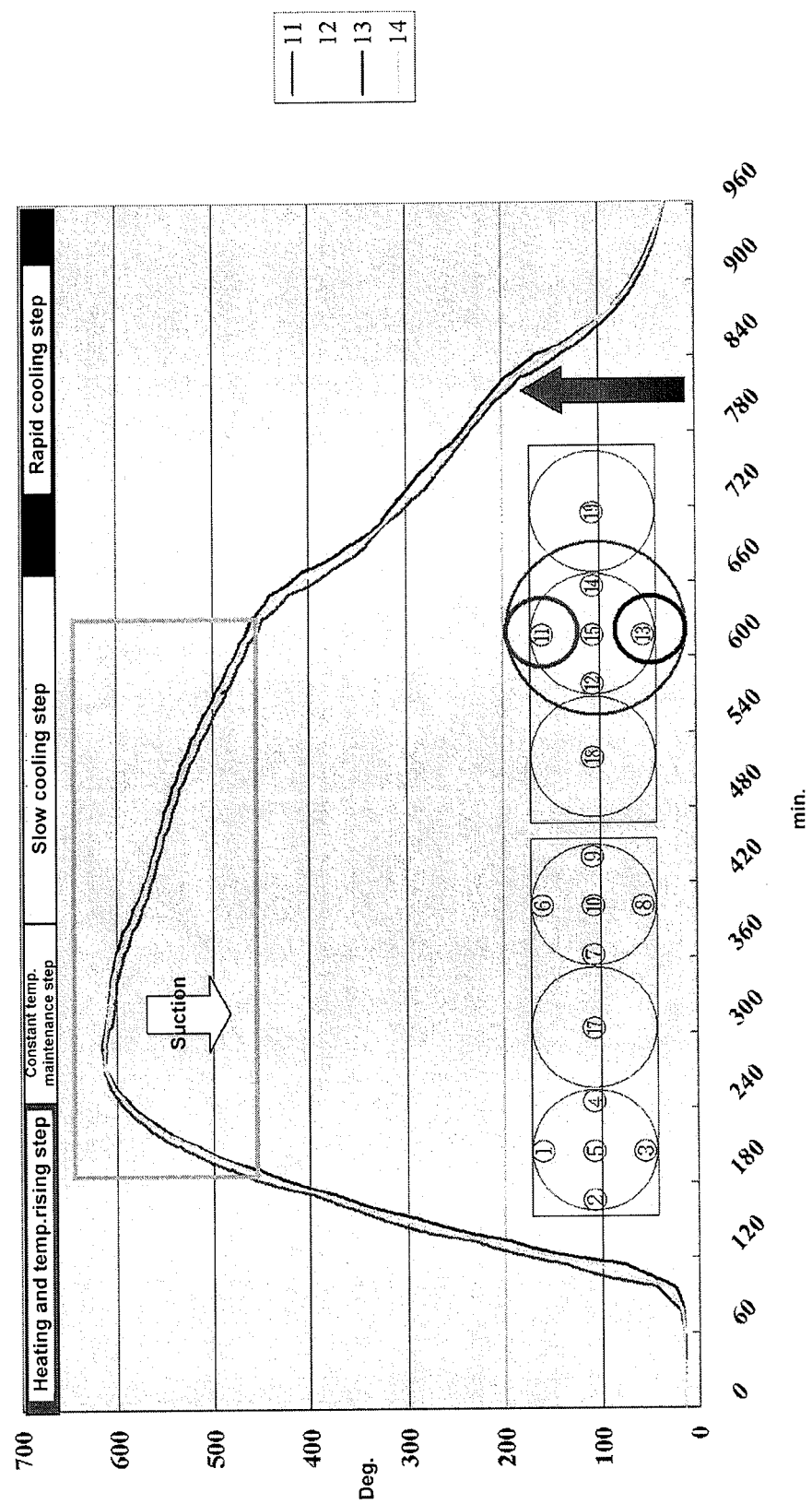
FIG. 16 shows the results of measurement (of the temperature distribution in the direction of advance and in a direction orthogonal to the direction of advance) of the temperature distribution in a continuous heating furnace.

Temperatures were measured in all six horizontally positioned forming molds; FIG. 16 shows the results of measuring the temperature distribution in the direction of advance and a direction perpendicular to the direction of advance on the forming molds within an electric furnace. As shown in FIG. 16, the temperature differential to the front and to the rear of the direction of advance on the forming molds was greatest in the heating and temperature rising step, and the temperature differential decreased at a maximum temperature of Tg or greater in the final stage of the heating and temperature rising step. In the initial period of the constant temperature maintenance step (recorded as "constant temperature maintenance step" in FIGS. 15 and 16), the temperature differential was 0, and in reversal, the temperature on the advance direction side became lower. From the subsequent slow cooling step (recorded as the "slow cooling step" in FIGS. 15 and 16) through the rapid cooling step (recorded as the "rapid cooling step" in FIGS. 15 and 16), this temperature differential was maintained. Additionally, based on sensor numbers 12 and 14, which moved straight forward along the direction of advance as shown in FIG. 15, there was a portion (for example, 700 seconds and beyond) in which the temperature in the direction of straight forward motion along the direction of advance was higher than in the direction originally presumed to be the direction of maximum temperature (the direction of advance in the temperature rising step and the direction opposite the direction of advance in the cooling step) in the continuous electric furnace. Based on these results, it can be understood that temperature control in the furnace and the temperature distribution on the forming surface do not necessarily match. In this regard, it is possible to make the period longer during which the portion of greater curvature on the forming surface is positioned on the high temperature side regardless of the direction in which the high temperature side is located in the first aspect, since the rotation conditions of the forming mold are determined based on the results of measurement of the temperature on the forming surface. Further, it is possible to increase the period during which the maximum curvature direction of the forming mold is located on the high temperature side regardless of the direction in which the high temperature side is located in the second aspect, since the rotation conditions of the forming mold are determined based on the results of measurement of the temperature on the forming surface. Since temperature controls in the furnace and the temperature distribution on the forming surface do not necessarily match as set forth above, it is desirable to actually measure the temperature on the forming surface and control deformation of the glass material based on the temperature distribution of the forming mold in the furnace to more effectively reduce the above-described astigmatism.

2. Examples and Comparative Examples Relating to the First Aspect

Example 1

(1) Specifying the Average Curvature and Determining the Angular Rotation Speed

A forming mold having a forming surface corresponding to a double-sided progressive dioptric power lens which had progressive elements on both surfaces was prepared.

Figure 17:
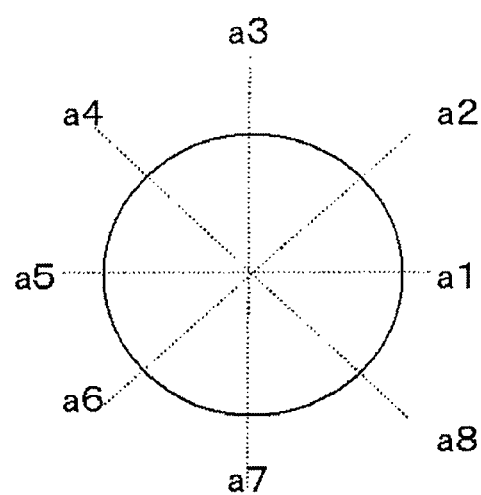
FIG. 17 shows the direction in which the average curvature is specified on the forming surface in Example 1.

As shown in FIG. 17, before placing a glass material on the forming mold, the average curvature was specified by the above-described method in eight directions (directions a1 to a8) at 45° intervals on the forming surface. Equation (1) below was employed to calculate the angular rotation speed.

$$\omega \cdot AC_n = 9.92 \qquad \text{Equation (1)}$$

(In Equation (1), $\omega$ denotes the angular rotation speed of the forming mold as direction $a_n$ passes through the maximum temperature direction, and $AC_n$ denotes the average curvature in direction $a_n$.)

The value 9.92 in Equation (1) is an approximate constant that includes variation of ±10 percent as set forth above.

Figure 18:
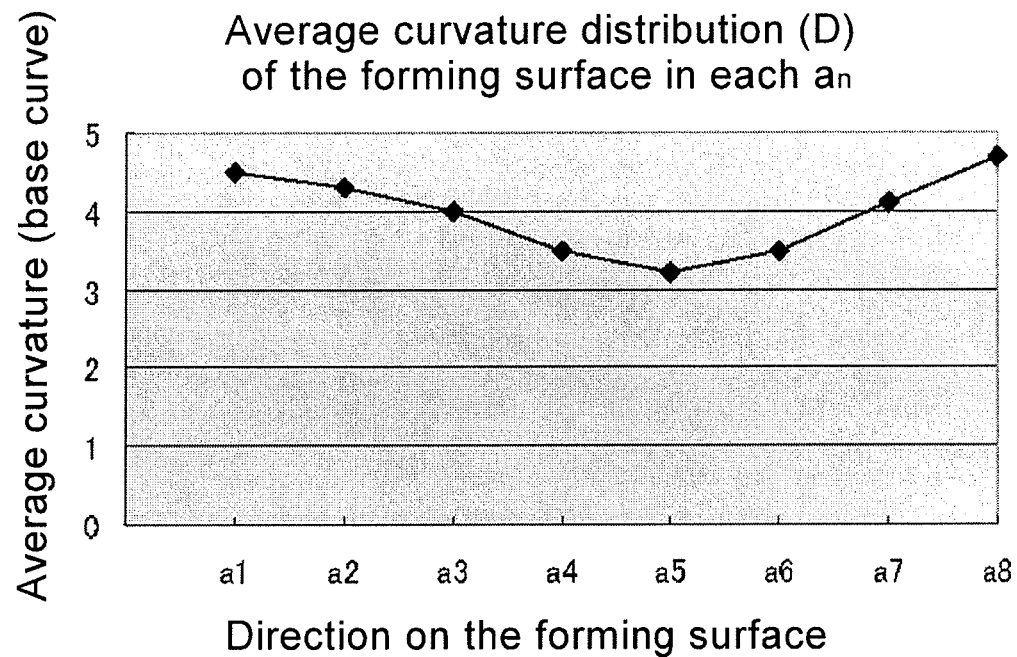
FIG. 18(*a*) shows the average curvature distribution on the forming surface in Example 1, and FIG. 18(*b*) shows the relation between angular rotation speed indicated in Table 2 and the direction passing through the maximum temperature direction.
Figure 18:
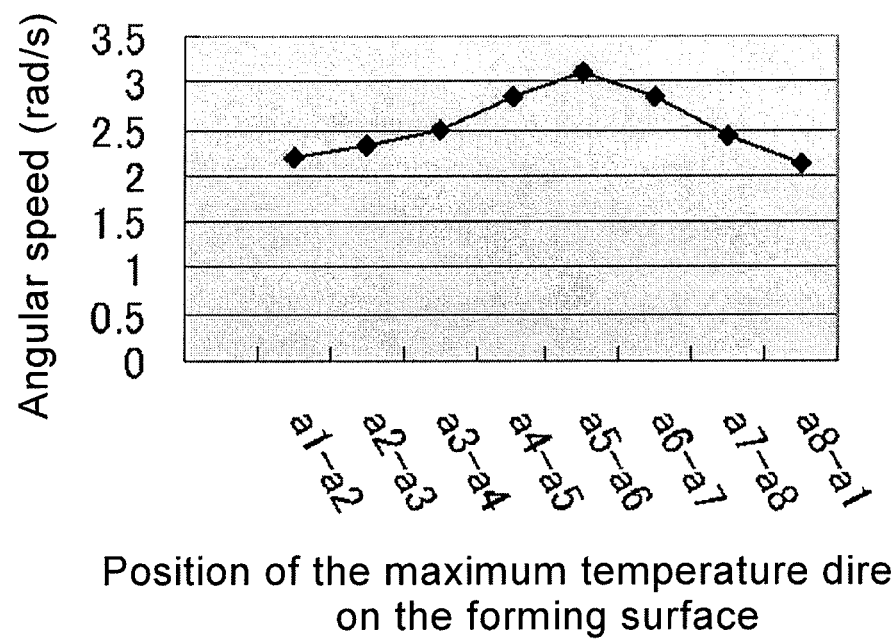

The average curvature in each direction and the angular rotation speeds that were calculated are given in Table 2 below. FIG. 18(a) gives the average curvature distribution on the forming surface and FIG. 18(b) gives the relation between the angular rotation speeds shown in Table 2 and the direction passing through the maximum temperature direction.

TABLE 2

| Direction | Average curvature (1/mm) | Angular rotation speed (rad/s) |
|---|---|---|
| a1 | 4.5 | 2.2044 |
| a2 | 4.3 | 2.3070 |
| a3 | 4.0 | 2.4800 |
| a4 | 3.5 | 2.8343 |
| a5 | 3.2 | 3.1000 |
| a6 | 3.5 | 2.8343 |
| a7 | 4.1 | 2.4195 |
| a8 | 4.7 | 2.1106 |

(2) Specifying the Maximum Temperature Direction

Figure 19:
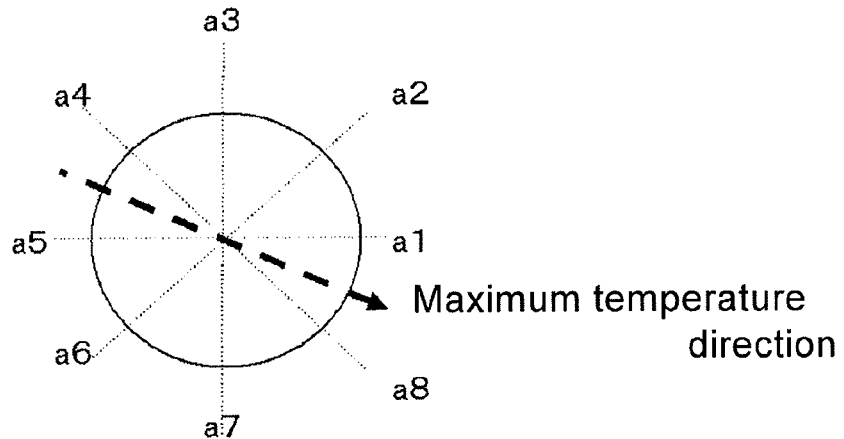
FIG. 19 shows the maximum temperature direction in the rapid heating and temperature-rising step in Example 1.
Figure 19:
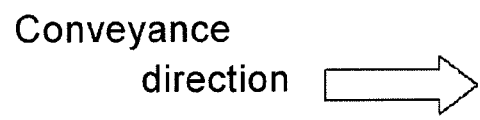
Figure 20:
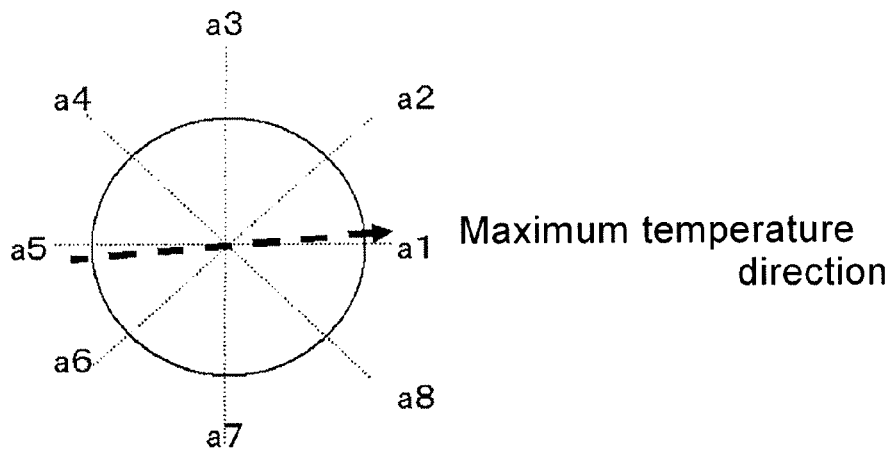
FIG. 20 shows the maximum temperature direction in the slow heating and temperature-rising step in Example 1.
Figure 20:

One thermocouple (K thermocouple 30 point made of platinum) was disposed in the forming mold to measure the temperature on the forming surface. Before positioning the forming mold, the forming mold was conveyed through an electric furnace and a heat treatment was conducted under the same conditions as in actual forming. The temperature was controlled in the electric furnace in the same manner as in the above specific embodiment. The various steps of (A) a preheating step, (B) a rapid heating and temperature-rising step, (C) a slow heating and temperature-rising step, (D) a constant temperature maintenance step, (E) a slow cooling step, (F) a rapid cooling step, and (G) a natural cooling step were separated by partitions. In step (B) and each of the subsequent steps, the temperature was measured by bringing the thermocouple into contact with individual measurement points at a pitch of 1° during rotation of the forming mold and the temperature was measured once in a total of 360 points in each zone separated by a partition. Based on the measurement results, the direction running from the geometric center of the forming surface toward the maximum temperature point among the measurement points measured was designated as the maximum temperature direction for each zone. For example, FIG. 19 shows the maximum temperature direction in the rapid heating and temperature-rising step, and FIG. 20 shows the maximum temperature direction in the slow heating and temperature-rising step.

One temperature measuring apparatus was employed in the present Example. However, as set forth above, multiple (for example, about 2 to 4) temperature measuring apparatus can be employed to measure the temperature distribution on the forming surface without rotating the forming mold. Further, the maximum temperature direction was specified and the angular rotation speed was determined for each zone before conveying the forming mold in the present Example. However, as set forth above, it is possible to establish temperature measurement positions at which the temperature on the forming surface of the forming mold is measured during conveyance within the furnace, and to control the angular rotation speed of the forming mold after passage through the temperature measurement positions based on the results of measurement at the temperature measurement positions.

(3) Molding the Glass Material in the Continuous Heating Furnace

In order to obtain a casting mold for a double-sided progressive dioptric power lens which had progressive elements on both surfaces, a glass preform of equal thickness in the normal direction, both surfaces of which were spherical, was placed on the forming surface of a forming mold having a forming surface corresponding to the above progressive dioptric power lens. The forming mold was repeatedly rotated 360° once in the positive direction and then in the opposite direction in all regions in the furnace. Further, the rotation in step (B) and each of the subsequent steps was conducted using a program capable of controlling the rotation based on the position at the angular rotation speeds shown in Table 2. As a result, it was possible for portions of considerable curvature on the forming surface to remain longer in the high temperature portion, and for portions of little curvature to be rotated rapidly. It was possible to convey the glass material being formed so that the greater the curvature of a portion, the greater the amount of heat it received from the electric furnace.

Subsequently, a formed article that had been discharged from the furnace was employed as a casting mold and a double-sided progressive dioptric power lens was obtained by cast polymerization. The outer diameter of the lens obtained was 75φ, and the surface average base curve was 4 D. The lens obtained was held to the lens holder in a lens meter and the astigmatism in the optical center or the dioptric power measurement reference point was measured as 0.01 D. The lens meter employed in the present Example was of the transmission type, but it is also possible to calculate the astigmatism based on analysis of the surface dioptric power from the results of measurement by a reflecting type surface dioptric power device or shape measuring device.

Comparative Example 1

With the exception that the forming mold was rotated at a constant angular rotation speed, a double-sided progressive dioptric power lens casting mold was obtained by the same method as in Example 1. The casting mold obtained was employed to obtain a double-sided progressive dioptric power lens by cast polymerization using the same method as in Example 1. The astigmatism of the lens obtained as measured by the above method was 0.06 D.

The standard for determining astigmatism in finished lenses is normally ±0.045 D or less.

In contrast to the lens obtained in Comparative Example 1 with astigmatism falling outside the above standard, it was possible to obtain a progressive dioptric power lens within the standard in Example 1. These results indicated that by suppressing the generation of astigmatism that was not necessary in eyeglass lens correction based on the first aspect, it was possible to provide a lens casting mold permitting the manufacturing of an eyeglass lens affording good wear sensation.

3. Examples and Comparative Examples Relating to the Second Aspect CL Example 2

In order to obtain a double-sided progressive dioptric power lens which had progressive elements on both surfaces, a glass preform of equal thickness in the normal direction (glass material 1), both surfaces of which were spherical, was placed on the forming surface of a forming mold having a forming surface corresponding to the above progressive dioptric power lens.

In order to obtain a progressive dioptric power lens having a progressive surface on either the convex or concave side thereof, a glass preform of equal thickness in the normal direction (glass material 2), both surfaces of which were spherical, was placed on the forming surface of a forming mold having a forming surface corresponding to the above progressive dioptric power lens.

The direction of maximum average curvature running from the geometric center of the forming surface to the perimeter portion (the maximum average curvature direction) was specified by the above-described method for each forming mold before positioning a glass material. On the forming surfaces of the forming molds for obtaining the above two types of lens, the direction running from the geometric center to a position corresponding to the reference point for measurement of near portion overlapped the maximum average curvature direction.

One thermocouple (K thermocouple 30 point made of platinum) was disposed in the forming mold to measure the temperature on the forming surface. The forming molds were conveyed within the electric furnace to conduct thermal treatment. The temperature was controlled in the electric furnace in the same manner as in the above specific embodiment. The various steps of (A) a preheating step, (B) a rapid temperature-rising step, (C) a slow heating and temperature-rising step, (D) a constant temperature maintenance step, (E) a slow cooling step, (F) a rapid cooling step, and (G) a natural cooling step were separated by partitions. Rotation of the forming mold in a positive direction and in the opposite direction was repeated throughout all regions in the furnace. Furthermore, in step (B) and each of the subsequent steps, the temperature was measured by bringing the thermocouple into contact with individual measurement points at a pitch of 1° during rotation of the forming mold and the temperature was measured once in a total of 360 points in each zone separated by a partition. The measurement results were inserted into Equation B to calculate the angular rotation speed at each position on the forming surface. Rotation of the forming mold in each zone was conducted so that the angular rotation speed reached the calculated angular rotation speed as the position corresponding to the reference point for measurement of near portion on the forming surface passed through each position. As a result, the rotation speed peaked when the maximum average curvature direction overlapped the high temperature direction. By controlling the rotation conditions in this manner, it was possible to conduct rotation slowly when the portion of maximum curvature on the forming surface was in the high temperature portion and rapidly when it was in the low temperature portion, and to convey the glass material being formed so that a greater quantity of heat was distributed by the electric furnace to the maximum curvature portion.

Figure 22:
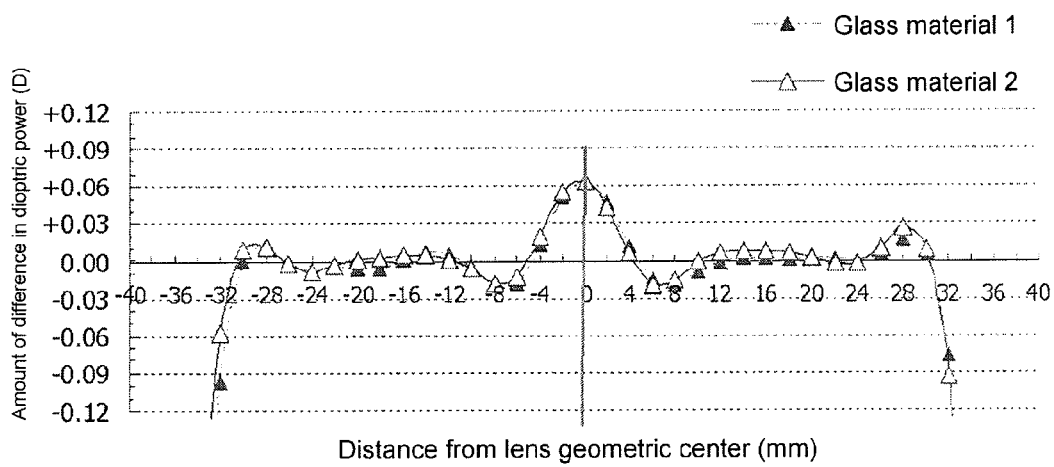
FIG. 22 shows shape errors relative to design values in the shape of the upper surface of the glass material formed in Example 2.

Subsequently, the shape error (design value-design value) relative to the design value of the shape of the upper surface of the glass material discharged to the exterior of the furnace was measured with Talysurf. The results are given in FIG. 22. As shown in FIG. 22, the error level was 0.03 D or less, making it possible to reduce the absolute value of the error level. Further, as shown in FIG. 22, symmetry of error distribution was also maintained. Maintaining symmetry of the error level in lens manufacturing makes it possible to suppress the generation of astigmatisms that are unnecessary in eyeglass correction. At the same time, it is also possible to decrease the feeling of discomfort when wearing the eyeglass lens due to asymmetry of the error level.

In addition, it is also appropriate to keep the angular acceleration speed within a prescribed value by simultaneously calculating the angular rotation speed and checking the angular acceleration speed, and if necessary, reducing the overall value of the average angular acceleration speed.

Further, in the present invention, the forming mold is repeatedly rotated, but it is unnecessary to measure the temperature distribution once each rotation of the forming mold. It is possible to measure the temperature distribution once for each zone and determine the rotation conditions in each zone based on the results of the measurement, as was done in Example 2. The forming mold can be continuously rotated, or can be intermittently rotated. For example, since nonuniformities in the temperature distribution tend to develop in the vicinity of partitions separating the various zones within the furnace, it is possible to rotate the forming mold just in the vicinity of the partitions to eliminate nonuniformities.

Example 2 is an embodiment employing a forming mold in which the direction running from the geometric center toward a position corresponding to the reference point for measurement of near portion overlaps the maximum average curvature direction on the forming surface.

An Example of another embodiment will be described below.

Example 3

In order to obtain a double-sided progressive dioptric power lens having progressive elements on both surfaces and in which near viewing dioptric power elements were distributed on both the convex and concave surfaces thereof, a glass preform (glass material 3) of equal thickness in the normal direction, both surfaces of which were spherical, was positioned on the forming surface of a forming mold having a forming surface corresponding to the above progressive dioptric power lens.

In order to obtain a single-vision lens having a progressive element, a glass preform (glass material 4) of equal thickness in the normal direction, both surfaces of which were spherical, was positioned on the forming surface of a forming mold having a forming surface corresponding to the above single-vision lens.

The direction running from the geometric center of the forming surface toward the perimeter portion in which the average curvature peaked (maximum average curvature direction) was specified by the above-described method for each forming mold before positioning the glass material.

The maximum average curvature direction didn't overlap the direction running from the geometric center toward a position corresponding to the reference point for measurement of near portion (the portion where the curvature peaked on the forming surface) on the forming surface of the forming mold employed in Example 2.

The remaining operations were conducted in the same manner as in Example 2. As a result, it was possible to conduct rotation slowly when the portion of maximum curvature on the forming surface was in the high temperature portion and rapidly when it was in the low temperature portion, and to convey the glass material being formed so that a greater quantity of heat was distributed by the electric furnace to the maximum curvature portion. In both glass materials 3 and 4, an error level of 0.03 D or less and maintenance of symmetry of error distribution were confirmed in the same manner as in Example 2.

Comparative Example 2

Figure 23:
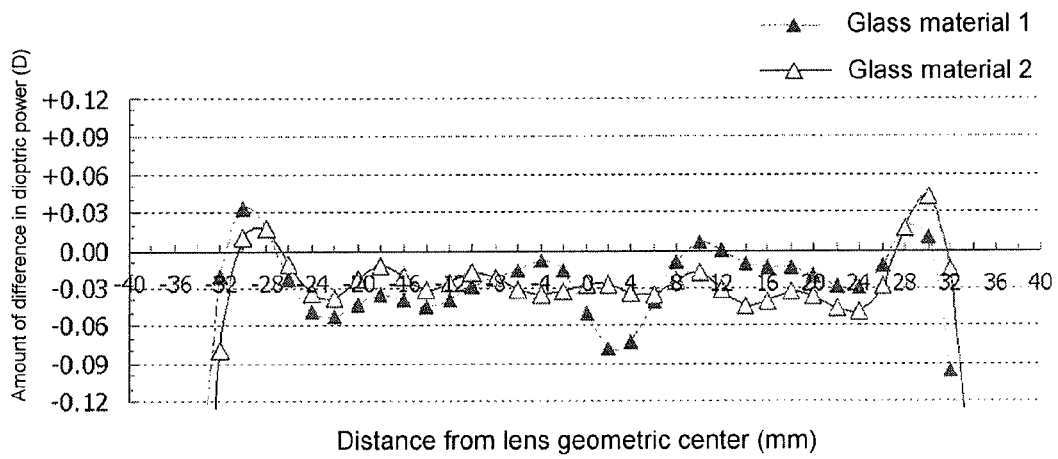
FIG. 23 shows errors relative to design values in the shape of the upper surface of the glass material formed in Comparative Example 2.

With the exception that the forming mold was not rotated in the electric furnace, forming by heating of two types of glass preform was conducted by the same method as in Example 2. The shape error relative to the design value of the upper surface shape of the glass material discharged to the exterior of the furnace was measured in the same manner as in Example 2. The results are given in FIG. 23. As shown in FIG. 23, no symmetry of error was exhibited by Comparative Example 2, and the error level was high.

The casting molds obtained in Examples 2 and 3 were employed to obtain double-sided progressive dioptric power lenses by cast polymerization. The outer diameter of the lenses obtained was 75ϕ, and the surface average base curve was 4 D. The astigmatism of both of the lenses obtained as measured by the same method as in Example 1 was 0.01 D. By contrast, the astigmatism of a double-sided progressive dioptric power lens obtained by cast polymerization by the same method as in Examples 2 and 3, with the exception that the forming mold obtained in Comparative Example 2 was employed, was 0.06 D. These results indicated that it was possible to provide an eyeglass lens affording good wear sensation by suppressing the generation of astigmatism that is unnecessary in eyeglass lens correction based on the second aspect.

4. Reference Examples and Reference Comparative Examples Relating to the Reference Aspect Reference Example 1

(1) Specifying the Average Curvature and Determining the Angular Rotation Speed

A forming mold having a forming surface corresponding to a progressive dioptric power lens, both surfaces of which were aspherical, was prepared.

The average curvature was specified by the above-described method in each of eight directions (directions a1 to a8) at 45° intervals on the forming surface as shown in FIG. 17 before placing a glass material in the forming mold. Equation (a) below was employed to calculate the angular rotation speed.

$$\omega \cdot AC_n = 9.92 \qquad \text{Equation (a)}$$

(In Equation (a), ω denotes the angular rotation speed of the forming mold as direction $a_n$ passes through a direction perpendicular to the maximum temperature direction, and $AC_n$ denotes the average curvature in direction $a_n$.)

The value 9.92 in Equation (a) is an approximate constant that includes variation of ±10 percent as set forth above.

(2) Specifying the Maximum Temperature Direction

The maximum temperature direction was specified in the same manner as in Example 1. FIG. 19 shows the maximum temperature direction in the rapid heating and temperature-rising step, and FIG. 20 shows the maximum temperature direction in the slow heating and temperature-rising step.

In the present reference example, the maximum temperature direction was specified in each zone and the angular rotation speed was determined before conveying the forming mold. However, as set forth above, it is also possible to establish temperature measurement positions at which the temperature of the forming mold is measured during conveyance through the furnace, and to control the angular rotation speed of the forming mold based on the results of measurement at the temperature measurement positions once it has passed through the temperature measurement positions.

(3) Forming a Glass Material in a Continuous Heating Furnace

In order to obtain a casting mold for a progressive dioptric power lens both surfaces of which are aspherical, a glass preform of equal thickness in the normal direction, both surfaces of which were spherical, was placed on the forming surface of a forming mold having a forming surface corresponding to the above progressive dioptric power lens both surface of which are aspherical. The temperature was controlled in the electric furnace in the same manner as in the above-described specific embodiment and the forming mold was repeatedly rotated 360° once in the positive direction and then in the opposite direction in all regions in the furnace. Further, the rotation in step (B) (the rapid heating and temperature-rising step) and each of the subsequent steps was conducted using a program capable of controlling the rotation based on the position at angular rotation speeds determined based on Equation (a). As a result, it was possible to conduct rotation of the forming mold so that the angular rotation speed was minimized when the axis having two maximum curvature points on the forming surface passed through the direction perpendicular to the maximum temperature direction.

Subsequently, the formed article discharged to the exterior of the furnace was employed as a casting mold and a progressive dioptric power lens both surfaces of which were aspherical was obtained by cast polymerization. The outer diameter of the lens obtained was 75ϕ, and the surface average base curve was 4 D. The astigmatism of the lens obtained as measured by the same method as in Example 1 was 0.01 D.

Comparative Reference Example 1

With the exception that the forming mold was rotated at a constant angular rotation speed, a casting mold for a progressive dioptric power lens both surfaces of which were aspherical was obtained by the same method as in Reference Example 1. The casting mold obtained was employed to obtain a double-sided progressive dioptric power lens by cast polymerization by the same method as in Reference Example 1. The astigmatism of the lens obtained was measured by the above method was 0.06 D.

The standard for determining astigmatism in finished lenses is normally ±0.045 D or less.

In contrast to the lens obtained in Comparative Reference Example 1 with astigmatism falling outside the above standard, it was possible to obtain a progressive dioptric power lens, both surfaces of which were aspherical, within the standard in Reference Example 1. These results indicated that by suppressing the generation of astigmatism that was not necessary in eyeglass lens correction based on the present invention, it was possible to provide a lens casting mold permitting the manufacturing of an eyeglass lens affording good wear sensation.

Reference Example 2

With the following exceptions, a casting mold for an astigmatic dioptric power lens having plus dioptric power was obtained by the same method as in Reference Example 1.

A forming mold having a forming surface corresponding to an astigmatic dioptric power lens with plus dioptric power was prepared.

A glass preform of equal thickness in the normal direction, both surfaces of which were spherical, was placed on the forming surface of the forming mold having a forming surface corresponding to the above astigmatic dioptric power lens. The forming mold was conveyed so that the position corresponding to the second major meridian of the above astigmatic dioptric power lens (axis containing two maximum curvature points) was perpendicular to the maximum temperature direction in the above-described step (B) and each of the subsequent steps, without rotating the forming mold in the furnace.

Subsequently, the formed article that was discharged to the exterior of the furnace was employed as a casting mold and an astigmatic dioptric power lens with plus dioptric power was obtained by cast polymerization. The outer diameter of the lens obtained was 75ϕ, and the surface average base curve was 4 D. The astigmatism of the lens obtained as measured by the same method as in Example 1 was 0.01 D.

The above results showed that it was possible to provide an eyeglass lens affording good wear sensation by suppressing the generation of astigmatism that was unnecessary in eyeglass correction based on the reference aspect. In Reference Examples 1 and 2 above, the position of the forming mold during conveyance through the furnace was controlled based on the temperature distribution on the forming surface of the forming mold. However, it is also possible to obtain a lens casting mold permitting the manufacturing of an eyeglass lens with an astigmatism lying within the above standard by controlling the position of the forming mold during conveyance through the furnace using the forming mold conveyance direction as a reference direction, as set forth above.

The present invention and the reference aspect are useful in the field of manufacturing eyeglass lenses.

The invention claimed is:

1. A method of manufacturing an eyeglass lens comprising:
   manufacturing a lens casting mold by
      introducing a forming mold, with a forming surface having a curvature Distribution on which a glass material being formed is positioned, into a continuous heating furnace, and
   conducting a thermal treatment while conveying the forming mold in the furnace to form an upper surface of the glass material being formed by bringing a lower surface of the glass material being formed into tight contact with the forming surface,
   wherein the thermal treatment comprises:
      specifying an average curvature in a direction running from a geometric center toward a perimeter portion of the forming surface of the forming mold in two or more different directions before introduction to the furnace, wherein an integer n denotes each of the two or more different directions without overlap of the integer n;
      directly or indirectly measuring a temperature at two or more measurement points on the forming surface of the forming mold in one or two or more regions within the furnace and specifying as a maximum temperature direction a direction running from the geometric center of the forming surface toward a point among the two or more measurement points that measure the highest temperature;

continuously or intermittently repeating approximately full circle rotations along the axis of an advancing direction of the forming mold during passage through the furnace; and conducting the rotations in the region in which the maximum temperature direction has been specified such that an angular rotation speed of the forming mold decreases as the average curvature in an $n^{th}$ direction passing through the maximum temperature direction increases; and manufacturing an eyeglass lens by cast polymerization with the lens casting mold that has been manufactured, or some part thereof, as a casting mold.

2. The method of manufacturing an eyeglass lens according to claim 1, wherein the eyeglass lens is a progressive dioptric power lens.

3. A method of manufacturing an eyeglass lens comprising: manufacturing a lens casting mold by introducing a forming mold, with a forming surface having a curvature distribution on which a glass material being formed is positioned, into a continuous heating furnace; and conducting a thermal treatment while conveying the forming mold in the furnace to form an upper surface of the glass material being formed into a shape of a molding surface for forming a surface comprising a progressive element or a progressive surface, wherein the thermal treatment comprises:

continuously or intermittently repeating a single rotation along the axis of an advancing direction of the forming mold during passage through the furnace; and providing within the furnace a forming surface temperature distribution measurement position and directly or indirectly measuring a temperature of a plurality of measurement points on the forming surface at the forming surface temperature distribution measurement position; and specifying a virtual line A passing through a geometric center and a maximum temperature point among a plurality of the measurement points, and a virtual line B orthogonal to the virtual line A and passing through the geometric center, wherein the virtual line B divides the forming surface into a high temperature portion and a low temperature portion, wherein the high temperature portion contains the maximum temperature point; and conducting the single rotation so that an angular rotation speed during a period when a portion on the forming surface of greatest curvature is present in the high temperature portion is lower than an angular rotation speed during a period when the portion is present in the low temperature portion; and manufacturing an eyeglass lens by cast polymerization with the lens casting mold that has been manufactured, or some part thereof, as a casting mold.

4. The method of manufacturing an eyeglass lens according to claim 3 wherein the eyeglass lens is a progressive dioptric power lens.

5. The method of manufacturing according to claim 1, wherein the angular rotation speed is determined so as to satisfy Equation A below:

$$\omega \cdot AC_n = k \qquad \text{Equation A}$$

wherein, in Equation A, $\omega$ denotes the angular rotation speed of the forming mold as the $n^{th}$ n direction passes through the maximum temperature direction; $AC_n$ denotes the average curvature in the $n^{th}$ direction; and k denotes an approximate constant.

6. The method of manufacturing according to claim 1, wherein the rotation is controlled so that the angular rotation speed is minimized when the direction running from the geometric center of the forming surface of the forming mold toward a portion where a curvature on the forming surface is maximum passes through the maximum temperature direction.

7. The method of manufacturing according to claim 6, wherein the lens casting mold is a progressive dioptric power lens casting mold, and the portion where a curvature on the forming surface peaks is a position corresponding to a reference point for measurement of near portion of the progressive dioptric power lens.

8. The method of manufacturing according to claim 3, wherein the rotation of the forming mold is conducted such that an angular rotation speed of the single rotation becomes is minimum when a direction running from the geometric center toward the maximum temperature point on the virtual line A approximately overlaps a direction on which an average curvature from the geometric center to a perimeter portion of the forming surface is maximum.

9. The method of manufacturing according to claim 3, wherein a plurality of the measurement points are arranged on concyclic positions on the forming surface to determine a correlation between the positions on the circle and temperature, and the single rotation is conducted at an angular rotation speed corresponding to the correlation that are determined.

10. The method of manufacturing according to claim 9, wherein the angular rotation speed is determined so as to satisfy Equation B below:

$$\omega \cdot (T - T\min + 1)/(T\max - T\min) = \text{const} \qquad \text{Equation B}$$

wherein, in Equation B, $\omega$ denotes the angular rotation speed, T denotes the temperature measured at a measurement point, Tmin denotes a minimum temperature among all measurement points, and Tmax denotes a maximum temperature among all measurement points.

11. The method of manufacturing according to claim 3, wherein the single rotation is conducted so that an angular acceleration speed during rotation is less than or equal to a predetermined reference value.

12. The method of manufacturing according to any of claim 3, wherein the portion on the forming surface of greatest curvature is at a position corresponding to a reference point for measurement of near portion of the lens.

* * * * *